US008818835B2

(12) United States Patent
Anderson

(10) Patent No.: US 8,818,835 B2
(45) Date of Patent: Aug. 26, 2014

(54) METHOD AND SYSTEM FOR INTEGRATING CALENDAR, BUDGET AND CASH FLOW OF A PROJECT

(75) Inventor: Donna Michelle Anderson, Sherman Oaks, CA (US)

(73) Assignee: DMA Ink, Beverly Hills, CA (US)

( * ) Notice: Subject to any disclaimer, the term of this patent is extended or adjusted under 35 U.S.C. 154(b) by 329 days.

(21) Appl. No.: 12/229,068

(22) Filed: Aug. 18, 2008

(65) Prior Publication Data

US 2009/0063245 A1   Mar. 5, 2009

Related U.S. Application Data

(60) Provisional application No. 60/956,662, filed on Aug. 17, 2007.

(51) Int. Cl.
*G06Q 10/00* (2012.01)
*G06Q 10/06* (2012.01)
*G06Q 10/10* (2012.01)
*G06Q 40/00* (2012.01)

(52) U.S. Cl.
CPC .......... *G06Q 10/10* (2013.01); *G06Q 10/06314* (2013.01); *G06Q 10/06375* (2013.01); *G06Q 10/0631* (2013.01); *G06Q 40/12* (2013.12); *G06Q 10/06313* (2013.01); *G06Q 10/103* (2013.01)
USPC ........ 705/7.24; 705/7.17; 705/7.18; 705/7.23

(58) Field of Classification Search
CPC ................................................ G06Q 10/06314
USPC ................................................ 705/7.11–7.42
See application file for complete search history.

(56) References Cited

U.S. PATENT DOCUMENTS

| | | | | |
|---|---|---|---|---|
| 6,047,260 | A | * | 4/2000 | Levinson ...................... 705/7.15 |
| 6,978,245 | B1 | * | 12/2005 | Tsuchiya et al. ............. 705/7.32 |
| 7,657,471 | B1 | * | 2/2010 | Sankaran et al. ............... 705/35 |
| 8,108,232 | B1 | * | 1/2012 | Brandes et al. .............. 705/7.11 |
| 2002/0038268 | A1 | * | 3/2002 | Yang et al. ........................ 705/30 |
| 2002/0174006 | A1 | * | 11/2002 | Rugge et al. ..................... 705/10 |
| 2003/0233303 | A1 | * | 12/2003 | Elazouni ........................ 705/36 |
| 2004/0030590 | A1 | * | 2/2004 | Swan et al. ....................... 705/7 |
| 2004/0122758 | A1 | * | 6/2004 | Wang .............................. 705/35 |
| 2004/0143477 | A1 | * | 7/2004 | Wolff .............................. 705/9 |
| 2004/0267595 | A1 | * | 12/2004 | Woodings et al. ................ 705/9 |
| 2005/0021381 | A1 | * | 1/2005 | Schnoerer et al. ................ 705/7 |
| 2005/0038636 | A1 | * | 2/2005 | Wakelam et al. ................. 703/1 |
| 2005/0114829 | A1 | * | 5/2005 | Robin et al. .................. 717/101 |
| 2005/0165631 | A1 | * | 7/2005 | Horvitz .............................. 705/7 |
| 2005/0187872 | A1 | * | 8/2005 | Schmidt et al. ................. 705/40 |

(Continued)

OTHER PUBLICATIONS

"ShowBiz Budgeting User Guide" Aug. 8, 2006 (http://www.showbizsolutions.com/ss/Products/SB/Showbiz_Budgeting_Users_Manual.pdf).*

(Continued)

*Primary Examiner* — Sujay Koneru
(74) *Attorney, Agent, or Firm* — Nath Goldberg & Meyer; Jerald L. Meyer; Stanley N. Protigal

(57) ABSTRACT

Generating budgeting information for a project is disclosed. An indication of a project phase and a time period associated with the project phase are received. Financial data associated with the project phase is received. Budgeting information is automatically generated based at least in part on the time period and the financial data.

40 Claims, 23 Drawing Sheets

(56) References Cited

U.S. PATENT DOCUMENTS

| | | | |
|---|---|---|---|
| 2005/0216324 A1* | 9/2005 | Maithell et al. | 705/8 |
| 2006/0047560 A1* | 3/2006 | Adams et al. | 705/10 |
| 2006/0095906 A1* | 5/2006 | Oikawa | 718/100 |
| 2007/0016495 A1* | 1/2007 | McHaney et al. | 705/28 |
| 2007/0016871 A1 | 1/2007 | Magnifico | |
| 2007/0078792 A1 | 4/2007 | Chen | |
| 2007/0106549 A1* | 5/2007 | Stocking | 705/10 |
| 2007/0174100 A1* | 7/2007 | Roy | 705/8 |
| 2007/0219931 A1* | 9/2007 | Daoud et al. | 705/400 |
| 2007/0277090 A1* | 11/2007 | Raja et al. | 715/503 |
| 2008/0015880 A1* | 1/2008 | Freedenberg et al. | 705/1 |
| 2008/0163156 A1* | 7/2008 | Grey | 717/101 |
| 2008/0312980 A1* | 12/2008 | Boulineau et al. | 705/7 |

OTHER PUBLICATIONS

Primavera "SureTrak Project Manager 3.0" (2002) (http://www.ims-web.com/media/6481/primavera_suretrak.pdf).*

Contract Manager User's Guide (2007) Primavera (https://www.dot.ny.gov/main/business-center/contractors/construction-division/construction-repository/Contract_Manager_User_Guide.pdf?nd=nysdot).*

Primavera P6 Project Management Reference Manual (2006) Primavera (https://www.dot.ny.gov/main/business-center/contractors/construction-division/construction-repository/PMRefMan.pdf?nd=nysdot).*

Australian Film Commission, "Foreign Film and Television Drama Production in Australia: A Research Report" [online], Jun. 2002, p. 1-64, http://www.afc.gov.au/downloads/policies/foreignprod.pdf.

* cited by examiner

FIG. 7 showStarter™
scheduling & budgeting plus

FOOD & TRAVEL

Home | My Projects | My Profile  Log Out  About Us  Contact Us  Help

⊙ Scheduling  ⊞ Budgeting  ⊞ Contacts

⊙ Cash Flow ○ Budget ○ Reports    Project Total: 12,700.00    Add/Create Phase    Add New

| # | Department | Week 8/9/2008 | Week 8/16/2008 | Week 8/23/2008 | Total |
|---|---|---|---|---|---|
| 10 | Management | | | | |
| 10010.002 | PRODUCER | 5,000.00 | 0.00 | 0.00 | 5,000.00 |
| | Sub Total | 5,000.00 | 0.00 | 0.00 | 5,000.00 |
| 14 | Production | | | | |
| 14010.001 | SUPERVISING PRODUCER | 0.00 | 2,500.00 | 0.00 | 2,500.00 |
| 14010.002 | SENIOR PRODUCER | 0.00 | 3,000.00 | 0.00 | 3,000.00 |
| | Sub Total | 0.00 | 5,500.00 | 0.00 | 5,500.00 |
| 17 | Location & Set | | | | |
| 17010.001 | DIRECTOR | 0.00 | 0.00 | 0.00 | 0.00 |
| | Sub Total | 0.00 | 0.00 | 0.00 | 0.00 |
| 20 | Post | | | | |
| 20010.001 | POST SUPERVISOR | 0.00 | 0.00 | 2,200.00 | 2,200.00 |
| | Sub Total | 0.00 | 0.00 | 2,200.00 | 2,200.00 |
| | Project Total | | | | 12,700.00 |
| | Grand Total | 5,000.00 | 5,500.00 | 2,200.00 | 12,700.00 |

Help

Budgeting - Cash Flow View
Enter and update weekly expenses and contacts and automatically update your production schedule at the same time.

Optimal Software Use
Show Starter™ strongly recommends that you prepare your deliverables from the scheduling screen rather than the budgeting screen. This approach enhances the integrity and consistency of all documents. When you have completed your production schedule, you may wish to manually update some of your expenses as below.

⊞ Edit Cash Flow Entries
⊞ Add New Cash Flow Entries
⊞ Add New Phase Pod

Home  My Projects  My Profile  Log Out  About Us  Contact Us  Help showStarter™
scheduling & budgeting Plus ○ Scheduling  ▣ Budgeting  ▣ Contacts
○ Cash Flow  ○ Budget  ● Reports   Project Total: 12,700.00

FOOD & TRAVEL

⇐ Back to Reports

Cover Page

| # | Department | Dept Total |
|---|---|---|
| 10 | Management | 5,000.00 |
| 14 | Production | 5,500.00 |
| 17 | Location & Set | 0.00 |
| 20 | Post | 2,200.00 |
|  | Total Fringes | 0.00 |
|  | Packaging Fee | 0.00 |
|  | EP Fee | 0.00 |
|  | Grand Total | 12,700.00 |

Help

Budgeting - Reports View

Generate a cover page, chart of accounts and reports (default template only) for your project.

To maintain Show Starter™'s unique schedule and budget synchronization, all reports are "Read Only." To make changes, update the associated line items and amounts in the Schedule or Cash Flow views. For numerical accuracy and integrity, the cross-departmental reports are available only for budgets created using our default templates.

▣ Reports

FIG. 13

Home | My Projects | My Profile | Log Out | About Us | Contact Us | Help

ShowStarter™
scheduling & budgeting plus

○ Scheduling | 🗐 Budgeting | 🗐 Contacts
○ Cash Flow ○ Budget ⊙ Reports | Project Total: 12,700.00

FOOD & TRAVEL

⬅ Back to Reports

Chart of Accounts

| # | Line Item |
|---|---|
| 10 | Management |
| 10010.002 | PRODUCER |
| 14 | Production |
| 14010.001 | SUPERVISING PRODUCER |
| 14010.002 | SENIOR PRODUCER |
| 17 | Location & Set |
| 17010.001 | DIRECTOR |
| 20 | Post |
| 20010.001 | POST SUPERVISOR |

Help

Budgeting - Reports View

Generate a cover page, chart of accounts and reports (default template only) for your project.

To maintain Show Starter™'s unique schedule and budget synchronization, all reports are "Read Only." To make changes, update the associated line items and amounts in the Schedule or Cash Flow views. For numerical accuracy and integrity, the cross-departmental reports are available only for budgets created using our default templates.

⊞ Reports

FIG. 14 showStarter™
scheduling & budgeting plus

Home | My Projects | My Profile | Log Out | About Us | Contact Us | Help

○ Scheduling | ● Budgeting | ■ Contacts | Project Total: 12,700.00
○ Cash Flow ○ Budget ● Reports

FOOD & TRAVEL

⇦ Back to Reports

Project Roster

| # | Department | Week 1 8/9/2008 | Week 2 8/16/2008 | Week 3 8/23/2008 |
|---|---|---|---|---|
| 10 | Management | | | |
| 10010.002 | PRODUCER | + | | |
| 14 | Production | | | |
| 14010.001 | SUPERVISING PRODUCER | | + | |
| 14010.002 | SENIOR PRODUCER | | + | |
| 17 | Location & Set | | | |
| 17010.001 | DIRECTOR | | | |
| 20 | Post | | | |
| 20010.001 | POST SUPERVISOR | | | + |
| | Total | 1 | 2 | 1 |

Help

Budgeting - Reports View

Generate a cover page, chart of accounts and reports (default template only) for your project.

To maintain Show Starter™'s unique schedule and budget synchronization, all reports are "Read Only." To make changes, update the associated line items and amounts in the Schedule or Cash Flow views. For numerical accuracy and integrity, the cross-departmental reports are available only for budgets created using our default templates.

⊞ Reports

FIG. 15 showStarter™
scheduling & budgeting plus

Home | My Projects | My Profile | Log Out | About Us | Contact Us | Help

[Scheduling] [Budgeting] [Contacts]                                                    FOOD & TRAVEL Filter by [Show All ▼] Type [Show All ▼] Search In [Show All ▼] Search Value [      ] [Search]

Help

Contacts

Contact listings are provided for information purposes only. A vendor's appearance in our database does not indicate their endorsement of this software, and it does not indicate Show Starter™'s endorsement or guarantee of the vendor's products or services.

View, add and search for staff, vendors and service providers for quick contacting and quotes.

⊞ View Contacts
⊞ Add Contacts
⊞ Edit/Delete contacts
⊞ Search Contacts

| First Name | Last Name | Title | Company | Work Phone | |
|---|---|---|---|---|---|
| Teresa | | Rep | Watchlight Corporation | 807-762-9964 | ✎ |
| | | Rep | L.A. Party Rents | 818-989-4300 | ✎ |
| | | Rep | Hollywood Production Sound | 213-250-5550 | ✎ |
| | | Rep | Avon Truck Rental | 323-850-0829 | ✎ |
| | | Rep | Intellius | | ✎ |
| Lyn | | Rep | Jackson Limousines | 323-734-9955 | ✎ |
| Don | | Rep | Axium Payroll | 818-557-2999 | ✎ |
| | | Rep | Hollywood Honeywagon & Production Vehicles, INC | 818-763-1966 | ✎ |
| Daniel | | Rep | Enterprise Car Rental | 818-762-0225 | ✎ |
| | | Assisted Payroll | Intuit Quickbooks | 800-365-9626 | ✎ |
| | | Rep | Big Vision Rentals | 818-841-4008 | ✎ |
| Albert | | Electrician | A&P Electrical Services | 818-400-1525 | ✎ |
| | | Rep | Modern Props | 323-934-3000 | ✎ |

FIG. 16

Weekly cash flow

| # | Department | Week 8/9/2008 | Week 8/16/2008 | Week 8/23/2008 | Week 9/13/2008 | Week 10/18/2008 | Week 10/25/2008 | Total |
|---|---|---|---|---|---|---|---|---|
| 10 | Management | | | | | | | |
| 10010.001 | EXECUTIVE PRODUCER | 12,000.00 | 0.00 | 0.00 | 0.00 | 0.00 | 0.00 | 12,000.00 |
| 10010.002 | PRODUCER | 5,000.00 | 0.00 | 0.00 | 0.00 | 0.00 | 0.00 | 5,000.00 |
| | Sub Total | 17,000.00 | 0.00 | 0.00 | 0.00 | 0.00 | 0.00 | 17,000.00 |
| 11 | Casting | | | | | | | |
| 11010.001 | CASTING DIRECTOR/PRODUCER | 0.00 | 2,000.00 | 0.00 | 0.00 | 0.00 | 0.00 | 2,000.00 |
| | Sub Total | 0.00 | 2,000.00 | 0.00 | 0.00 | 0.00 | 0.00 | 2,000.00 |
| 14 | Production | | | | | | | |
| 14010.001 | SUPERVISING PRODUCER | 0.00 | 2,500.00 | 0.00 | 2,500.00 | 0.00 | 0.00 | 5,000.00 |
| 14010.002 | SENIOR PRODUCER | 0.00 | 3,000.00 | 0.00 | 0.00 | 0.00 | 0.00 | 3,000.00 |
| | Sub Total | 0.00 | 5,500.00 | 0.00 | 2,500.00 | 0.00 | 0.00 | 8,000.00 |
| 15 | Story | | | | | | | |
| 15010.001 | WRITER | 100.00 | 0.00 | 0.00 | 0.00 | 0.00 | 0.00 | 100.00 |
| | Sub Total | 100.00 | 0.00 | 0.00 | 0.00 | 0.00 | 0.00 | 100.00 |
| 16 | Field | | | | | | | |
| 16010.001 | SUPERVISING FIELD PRODUCER | 0.00 | 100.00 | 0.00 | 0.00 | 0.00 | 0.00 | 100.00 |
| | Sub Total | 0.00 | 100.00 | 0.00 | 0.00 | 0.00 | 0.00 | 100.00 |
| 17 | Location & Set | | | | | | | |
| 17010.001 | DIRECTOR | 0.00 | 0.00 | 0.00 | 0.00 | 0.00 | 0.00 | 0.00 |
| | Sub Total | 0.00 | 0.00 | 0.00 | 0.00 | 0.00 | 0.00 | 0.00 |
| 20 | Post | | | | | | | |
| 20010.001 | POST SUPERVISOR | 0.00 | 0.00 | 2,200.00 | 0.00 | 0.00 | 0.00 | 2,200.00 |
| | Sub Total | 0.00 | 0.00 | 2,200.00 | 0.00 | 0.00 | 0.00 | 2,200.00 |
| 21 | New Media | | | | | | | |
| 21010.001 | NEW MEDIA PRODUCER | 0.00 | 2,000.00 | 0.00 | 0.00 | 0.00 | 2,000.00 | 4,000.00 |
| | Sub Total | 0.00 | 2,000.00 | 0.00 | 0.00 | 0.00 | 2,000.00 | 4,000.00 |
| | Project Total | | | | | | | 33,400.00 |
| | Grand Total | 17,100.00 | 9,600.00 | 2,200.00 | 2,500.00 | 0.00 | 2,000.00 | 33,400.00 |

FIG. 18 showStarter
scheduling & budgeting plus

Home | My Projects | My Profile | Log Out | About Us | Contact Us | Help

FOOD & TRAVEL

○ Scheduling | ● Budgeting | ▦ Contacts

● Cash Flow ○ Budget ○ Reports | Project Total: 33,400.00 | Add/Create Phase | Add New

1902

| # | Department | Week 8/9/2008 | Week 8/16/2008 | Week 8/23/2008 | Week 9/13/2008 | Total |
|---|---|---|---|---|---|---|
| | Management | | | | | |
| 10010.001 | EXECUTIVE PRODUCER | 12,000.00 | 0.00 | 0.00 | 0.00 | 12,000.00 |
| 10010.002 | PRODUCER | 5,000.00 | 0.00 | 0.00 | 0.00 | 5,000.00 |
| | Sub Total | 17,000.00 | 0.00 | 0.00 | 0.00 | 17,000.00 |
| | Casting | | | | | |
| 11010.001 | CASTING DIRECTOR/PRODUCER | 0.00 | 2,000.00 | 0.00 | 0.00 | 2,000.00 |
| | Sub Total | 0.00 | 2,000.00 | 0.00 | 0.00 | 2,000.00 |
| | Production | | | | | |
| 14010.001 | SUPERVISING PRODUCER | 0.00 | 2,500.00 | 0.00 | 2,500.00 | 5,000.00 |
| 14010.002 | SENIOR PRODUCER | 0.00 | 3,000.00 | 0.00 | 0.00 | 3,000.00 |
| | Sub Total | 0.00 | 5,500.00 | 0.00 | 2,500.00 | 8,000.00 |
| | Story | | | | | |
| 15010.001 | WRITER | 100.00 | 0.00 | 0.00 | 0.00 | 100.00 |
| | Sub Total | 100.00 | 0.00 | 0.00 | 0.00 | 100.00 |
| | Field | | | | | |
| 16010.001 | SUPERVISING FIELD PRODUCER | 0.00 | 100.00 | 0.00 | 0.00 | 100.00 |
| | Sub Total | 0.00 | 100.00 | 0.00 | 0.00 | 100.00 |
| | Location & Set | | | | | |
| 17010.001 | DIRECTOR | 0.00 | 0.00 | 0.00 | 0.00 | 0.00 |
| | Sub Total | 0.00 | 0.00 | 0.00 | 0.00 | 0.00 |
| | Post | | | | | |
| 20010.001 | POST SUPERVISOR | 0.00 | 0.00 | 2,200.00 | 0.00 | 2,200.00 |
| | Sub Total | 0.00 | 0.00 | 2,200.00 | 0.00 | 2,200.00 |

Help

Budgeting - Cash Flow View

Enter and update weekly expenses and contacts and automatically update your production schedule at the same time.

Optimal Software Use
Show Starter™ strongly recommends that you prepare your deliverables from the scheduling screen rather than the budgeting screen. This approach enhances the integrity and consistency of all documents. When you have completed your production schedule, you may wish to manually update some of your expenses as below.

⊞ Edit Cash Flow Entries
⊞ Add New Cash Flow Entries
⊞ Add New Phase Pod

Show Starter™ - Print Budget

Food & Travel
Cash Flow
08/13/2008

Page 1 of 3

Network:
Studio:
E/C/Line Producer:

Production Company:
Show Runner:

| # | Department | Week 8/9/2008 | Week 8/16/2008 | Week 8/23/2008 | Week 9/13/2008 |
|---|---|---|---|---|---|
| 10 | Management | | | | |
| 10010.001 | EXECUTIVE PRODUCER | 12,000.00 | 0.00 | 0.00 | 0.00 |
| 10010.002 | PRODUCER | 5,000.00 | 0.00 | 0.00 | 0.00 |
| | Sub Total | 17,000.00 | 0.00 | 0.00 | 0.00 |
| 11 | Casting | | | | |
| 11010.001 | CASTING DIRECTOR/PRODUCER | 0.00 | 2,000.00 | 0.00 | 0.00 |
| | Sub Total | 0.00 | 2,000.00 | 0.00 | 0.00 |
| 14 | Production | | | | |
| 14010.001 | SUPERVISING PRODUCER | 0.00 | 2,500.00 | 0.00 | 2,500.00 |
| 14010.002 | SENIOR PRODUCER | 0.00 | 3,000.00 | 0.00 | 0.00 |
| | Sub Total | 0.00 | 5,500.00 | 0.00 | 2,500.00 |
| 15 | Story | | | | |
| 15010.001 | WRITER | 100.00 | 0.00 | 0.00 | 0.00 |
| | Sub Total | 100.00 | 0.00 | 0.00 | 0.00 |
| 16 | Field | | | | |
| 16010.001 | SUPERVISING FIELD PRODUCER | 0.00 | 100.00 | 0.00 | 0.00 |
| | Sub Total | 0.00 | 100.00 | 0.00 | 0.00 |
| 17 | Location & Set | | | | |
| 17010.001 | DIRECTOR | 0.00 | 0.00 | 0.00 | 0.00 |
| | Sub Total | 0.00 | 0.00 | 0.00 | 0.00 |
| 20 | Post | | | | |
| 20010.001 | POST SUPERVISOR | 0.00 | 0.00 | 2,200.00 | 0.00 |
| | Sub Total | 0.00 | 0.00 | 2,200.00 | 0.00 |
| 21 | New Media | | | | |
| 21010.001 | NEW MEDIA PRODUCER | 0.00 | 2,000.00 | 0.00 | 0.00 |
| | Sub Total | 0.00 | 2,000.00 | 0.00 | 0.00 |
| | Grand Total | 17,100.00 | 9,600.00 | 2,200.00 | 2,500.00 |

FIG. 20A

Show Starter™ - Print Budget

Page 2 of 3

| # | Department | Week 10/18/2008 | Week 10/25/2008 | Total |
|---|---|---|---|---|
| 10 | Management | | | |
| 10010.001 | EXECUTIVE PRODUCER | 0.00 | 0.00 | 12,000.00 |
| 10010.002 | PRODUCER | 0.00 | 0.00 | 5,000.00 |
| | Sub Total | 0.00 | 0.00 | 17,000.00 |
| 11 | Casting | | | |
| 11010.001 | CASTING DIRECTOR/PRODUCER | 0.00 | 0.00 | 2,000.00 |
| | Sub Total | 0.00 | 0.00 | 2,000.00 |
| 14 | Production | | | |
| 14010.001 | SUPERVISING PRODUCER | 0.00 | 0.00 | 5,000.00 |
| 14010.002 | SENIOR PRODUCER | 0.00 | 0.00 | 3,000.00 |
| | Sub Total | 0.00 | 0.00 | 8,000.00 |
| 15 | Story | | | |
| 15010.001 | WRITER | 0.00 | 0.00 | 100.00 |
| | Sub Total | 0.00 | 0.00 | 100.00 |
| 16 | Field | | | |
| 16010.001 | SUPERVISING FIELD PRODUCER | 0.00 | 0.00 | 100.00 |
| | Sub Total | 0.00 | 0.00 | 100.00 |
| 17 | Location & Set | | | |
| 17010.001 | DIRECTOR | 0.00 | 0.00 | 0.00 |
| | Sub Total | 0.00 | 0.00 | 0.00 |
| 20 | Post | | | |
| 20010.001 | POST SUPERVISOR | 0.00 | 0.00 | 2,200.00 |
| | Sub Total | 0.00 | 0.00 | 2,200.00 |
| 21 | New Media | | | |
| 21010.001 | NEW MEDIA PRODUCER | 0.00 | 2,000.00 | 4,000.00 |
| | Sub Total | 0.00 | 2,000.00 | 4,000.00 |
| | Project Total | | | 33,400.00 |
| | Grand Total | 0.00 | 2,000.00 | 33,400.00 |

FIG. 20B

Show Starter™ - Print Budget　　　　　　　　　　　　　　　　　　　　　　　Page 3 of 3

| # | Line Item | Comments |
|---|-----------|----------|

FIG. 20C

METHOD AND SYSTEM FOR INTEGRATING CALENDAR, BUDGET AND CASH FLOW OF A PROJECT

CROSS REFERENCE TO OTHER APPLICATIONS

This application claims priority to U.S. Provisional Patent Application No. 60/956,662 entitled SCHEDULING AND BUDGETING APPLICATION filed Aug. 17, 2007 which is incorporated herein by reference for all purposes.

BACKGROUND OF THE INVENTION

Production professionals create draft schedules, budgets, cash flow documents and contacts to accompany their projects, throughout the pitching and development process and into production, updating each as changes arise. A project might go through a dozen or more schedules, budgets, cash flow documents and contact sheets from pitch to broadcast and delivery of final documents.

Companies must first schedule the different phases of production (pre-production, post, etc.) by number of departments and time needed. Then each of those weeks is broken down by components (how many staff members, editing suites, etc.). Those components build the basis of the production calendar or schedule. The cost of those components builds the basis of the production budget (reflecting overall costs) and production cash flow (periodic costs, e.g., weekly expenses). Finally, the more "fixed" operating costs (overhead, insurance, etc.) complete the budget and cash flow documents.

Many production professionals build schedules in calendaring software with user interfaces that defy simple updates or dramatic schedule changes. The vast majority of production professionals build budgets and cash flow documents in spreadsheet software, often with formula errors, that they copy from show to show and adapt. Quotes are updated manually with every new project. Changes to a show's schedule cannot easily be reflected in the show's budget and cash flow, or vice-versa. As a result, this approach is inconvenient, time-consuming and error-prone.

In addition, the common calendaring software applications that most companies use are highly inflexible. The typical production constantly changes start or end dates and loses or adds production weeks several times in the production process. Common software requires manual cutting and pasting of every changed item on the calendar, which is time-consuming and all too easily causes scheduling mistakes. Worse, those changes must be manually documented then manually entered into the budgeting and/or cash flow applications for conformity.

Common calendaring software applications are highly inflexible. In some calendar programs, additional entries that exceed the defined space on the interface do not appear on the original interface. Instead, a visual cue, such as a down arrow or ellipses, indicates more entries appear on the date. This prevents the user from seeing all items for that date in the interface and precludes printing a calendar that shows all events on that date.

In addition, common spreadsheet software applications are inconvenient, time-consuming and error-prone. When creating a spreadsheet, a user may create a range of data that exceeds the width and/or length of a viewable page (as defined by industry standard screen sizes). Current practice requires toggling to a "print view" interface to see the data in page format, but print views do not allow editing within the interface. Editing requires returning to the editing interface, searching for the data or data range to be edited, performing any changes, then toggling back to print view to see it in page format again, a process that is time-consuming and ripe for error. In addition, in some applications, a user can define a printable area to restrict the content to be printed so it fits on the printed page or allow the spreadsheet application to print according to default page breaks. A user also can define repeating upper rows or left-side columns. The problem is, a user must individually set all parameters for the printed page, which can be time-consuming to do and put the user at risk for error.

BRIEF DESCRIPTION OF THE DRAWINGS

Various embodiments of the invention are disclosed in the following detailed description and the accompanying drawings.

FIG. 2 is a diagram illustrating an embodiment of a project management user interface of a scheduling and budget application.

FIG. 3 is a diagram illustrating an embodiment of an add project user interface of a scheduling and budget application.

FIG. 4 is a diagram illustrating an embodiment of a calendar user interface of a scheduling and budget application.

FIG. 5 is a diagram illustrating an embodiment of a project phase user interface of a scheduling and budget application.

FIG. 6 is a diagram illustrating an embodiment of a calendar user interface of a scheduling and budget application after a project phase has been added.

FIG. 7 is a diagram illustrating an embodiment of a calendar user interface of a scheduling and budget application with four project phases.

FIG. 9 is a diagram illustrating an embodiment of a cash flow user interface of a scheduling and budget application.

FIG. 10 is a diagram illustrating an embodiment of a project phase user interface that is accessible from the cash flow user interface.

FIG. 13 is a diagram illustrating an embodiment of a cover page report.

FIG. 14 is a diagram illustrating an embodiment of a chart of accounts report.

FIG. 15 is a diagram illustrating an embodiment of a project roster report.

FIG. 16 is a diagram illustrating an embodiment of a contacts user interface of a scheduling and budget application.

FIG. 18 illustrates an example of a full spreadsheet view of a spreadsheet.

FIG. 19A illustrates an example of page one of a page format view of a spreadsheet.

FIG. 19B illustrates an example of page two of a page format view of a spreadsheet.

FIGS. 20A-20C illustrate an example of a printout of the spreadsheet of FIG. 18.

DETAILED DESCRIPTION

Figure 1:
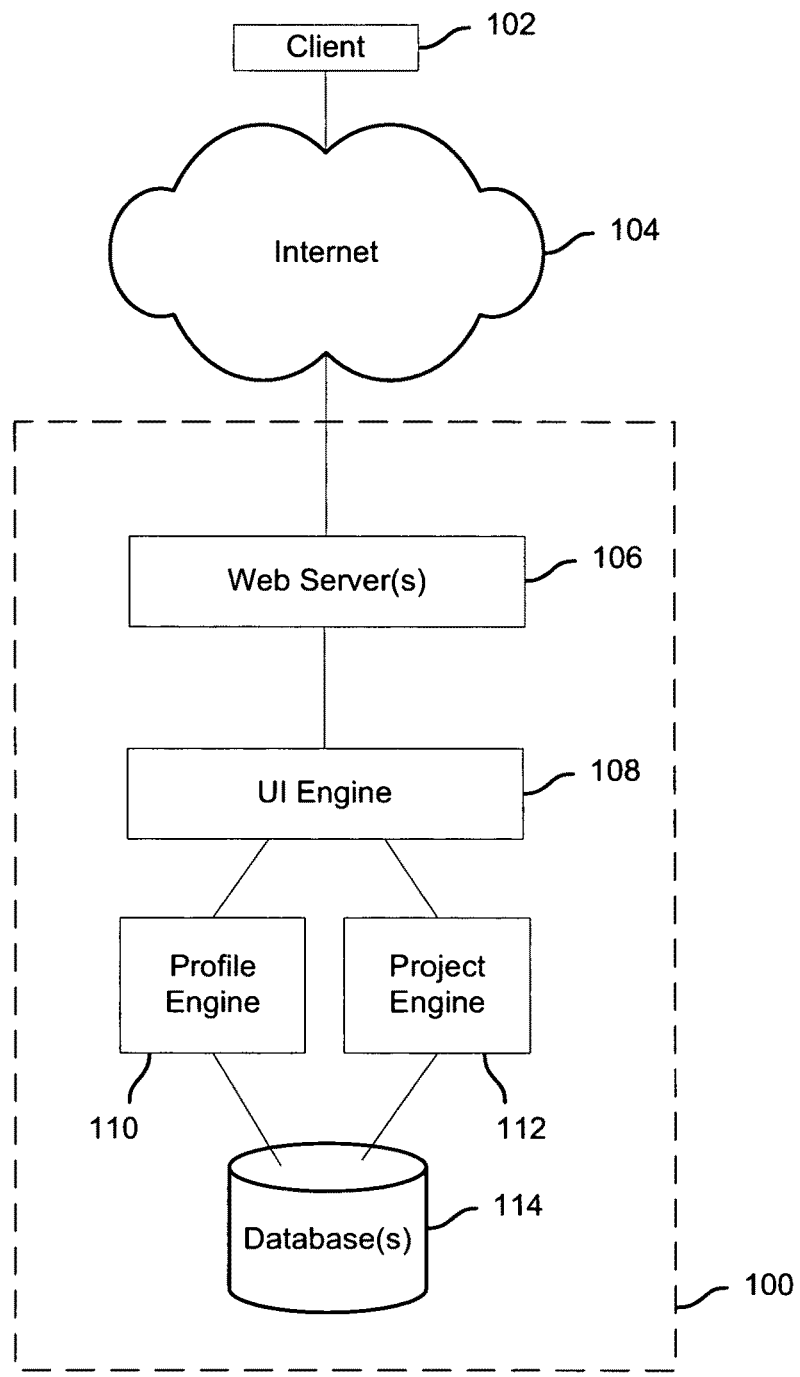
FIG. 1 is a block diagram illustrating an embodiment of a system for generating scheduling and budgeting information for a project.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A scheduling and budgeting application and a technique for generating budget data for a project are disclosed. In some embodiments, the scheduling and budget application creates a database of industry standard budgeting and scheduling items and industry-related staff and vendors that is shared by all user interfaces in the application, thereby allowing users to create projects with fully synchronized schedules, budgets, cash flows and contacts that share the same core data and therefore reflect updates in one user interface (UI) across all UIs. In some embodiments, the scheduling and budget application further offers a user interface for data manipulation that allows a user to move multiple sub-units of a calendar in unison and dynamically update the associated data across all UIs. In some embodiments, the scheduling and budget application further allows a user to visually review and print all data in the schedule/Calendar UI regardless of the amount on screen by compressing the display of data in the UI.

Common deliverables in business and production include: project schedule, master budget, cash flow and contact list. In some applications, a professional creates a schedule in writing, a spreadsheet or a calendar program (a monthly calendar is the standard format for production schedules). The professional next manually translates those weeks into the staff, vendors and line items expenses associated with each week to create a master budget. Next, the professional will have to break that budget back down into weeks to create a weekly cash flow document. Finally, the professional must build and maintain a staff and vendor list for the project. On a non-fiction TV show, for example, this process can take 5-7 days.

By contrast, in some embodiments, the scheduling and budget application creates a calendar user interface that allows professionals to associate line item expenses, staff and vendors with each week as they schedule. Upon completion of the schedule, the cash flow, master budget and contact list also are completed. Using the scheduling and budget application, the total time for this process on a non-fiction TV show now will take about 3-5 hours.

Professionals currently must create deliverables (schedule, budget, cash flow, reports, contact list) as separate documents. If one document is edited or updated, those changes must be manually translated, calculated and updated in each of the other documents independently. This is time-consuming and creates an enormous risk of error. By contrast, in some embodiments, the scheduling and budget application links all of the documents in a single project, allowing the user to easily update in one of the user interfaces, which updates the rest of the documents automatically.

FIG. 1 is a block diagram illustrating an embodiment of a system for generating scheduling and budgeting information for a project. In the example shown, client 102 interacts with internet 104, which is coupled to scheduling and budget application 100. Client 102, may include, for example, a computer device, such as a laptop, desktop, or mobile device configured to run a web browser that is able to interact with internet 104. Internet 104 may comprise the Internet, an intranet, or any appropriate network of computer devices.

In this example, scheduling and budget application 100 includes web server(s) 106, user interface (UI) engine 108, profile engine 110, project engine 112, and database(s) 114. In various embodiments, scheduling and budget application 100 may be implemented in other ways. For example, one or more of modules 106-114 and/or other modules may be included in scheduling and budget application 100 in other embodiments.

Web server(s) 106 may comprise one or more web servers, such as a web server cluster. UI engine 108 manages the user interface of scheduling and budget application 100. For example, UI engine 108 receives input from client 102 via web server 106, interprets the input, and sends appropriate messages to profile engine 110 and/or project engine 112. In the reverse direction, UI engine 108 may display data obtained from database(s) 114 via profile engine 110 and/or project engine 112 and display the data in the user interface of scheduling and budget application 100. Examples of some of the user interfaces of scheduling and budget application 100 include: calendar user interface, project phase user interface, cash flow user interface, budget user interface, reports user interface, and project management user interface. Detailed examples of these user interfaces are more fully described below.

Profile engine 110 and project engine 112 are used to manage various profiles and projects associated with scheduling and budget application 100. In some embodiments, a profile is associated with an account or subscription, which may have one or more projects. In some embodiments, a user opens an account for scheduling and budget application 100 and enters profile metrics into a UI to register for the site, including defining their user type (e.g., producer, director, editor). The user selects from account options and purchases a subscription. Profile engine 110 creates a record in database(s) 114 for the user and activates the user's login credentials. In some embodiments, scheduling and budget application 100 uses an account based access model, requiring a one time payment to access. In some embodiments, scheduling and budget application 100 uses a subscription based access model, requiring a periodic subscription payment to access. The examples herein may describe one access model, but any access model may be used in various embodiments.

Database(s) 114 may comprise one or more databases, such as a database cluster. Database(s) 114 is used to store data associated with the scheduling and budget application 100, including profile data and project data. Project data may include information associated with a project, including project phases, time periods, financial data, and budgeting information. Budgeting information can include a budget or a cash flow. Profile engine 110 and project engine 112 may send database queries to and receive result sets from database(s) 114.

In various embodiments, a user uses scheduling and budget application 100 via client 102. Examples of users of scheduling and budget application 100 include:

Users Creating and Managing Projects. Scheduling and budget application 100 serves as a tool for creating, maintaining and overseeing schedules, cash flows, budgets, pro formas and contacts for a given project.

Users Implementing Project Mandates for Project Managers/Creators. Scheduling and budget application 100 allows open or limited access to asset distribution and other project information for users who make choices and implementations based on information contained in the project documents.

Users Funding or Auditing Projects. Scheduling and budget application 100 allows shared or limited access to original and current project documents for users who oversee or vet such documents.

Although in the examples herein, the scheduling and budget application is described with respect to entertainment production scheduling and budgets, in various embodiments, the scheduling and budget application may be used in a variety of industries and applications, including, for example, law, engineering, and business.

Figure 2:
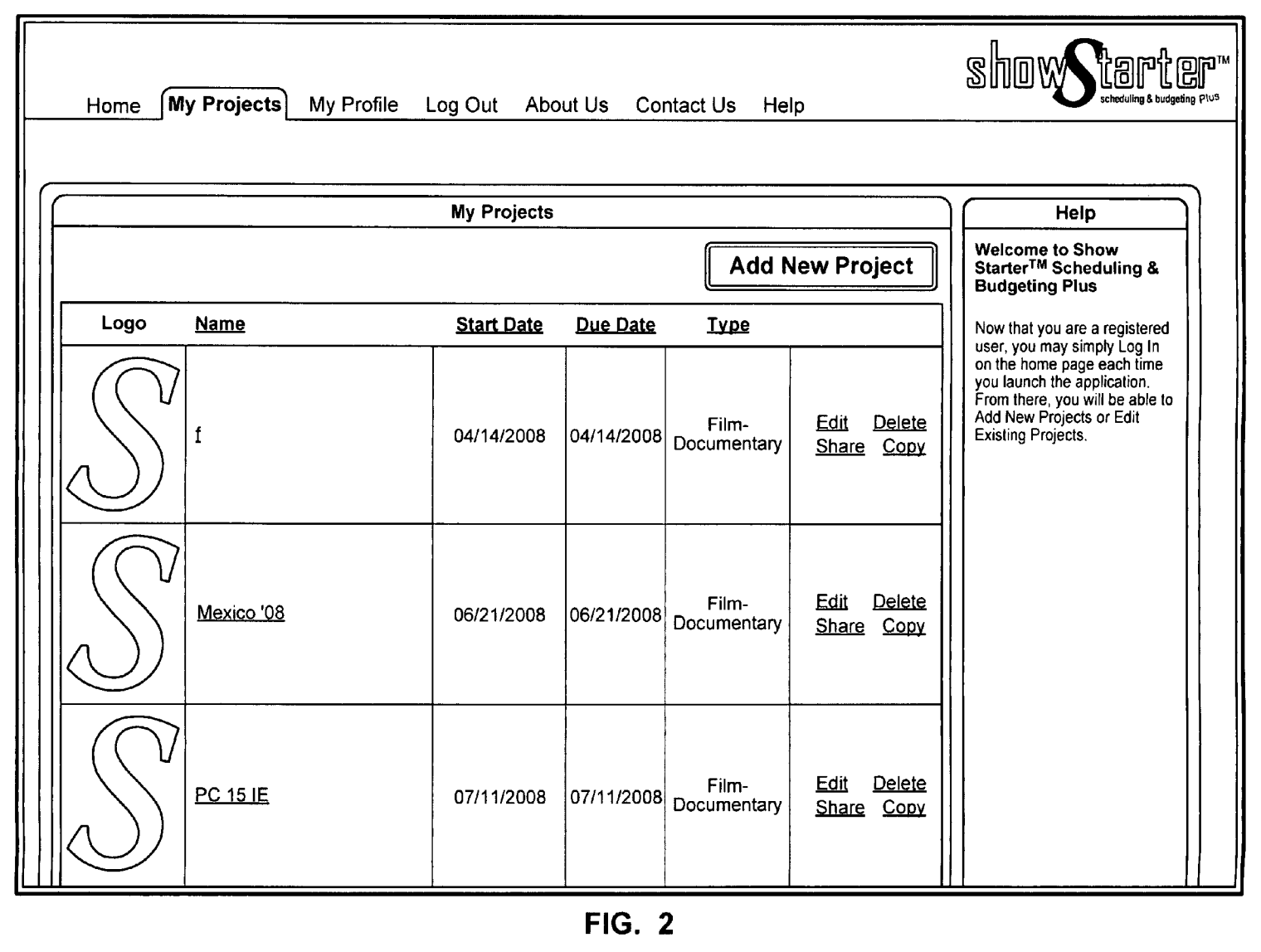

FIG. 2 is a diagram illustrating an embodiment of a project management user interface of a scheduling and budget application. In the projects user interface example shown, a UI engine displays a project list with a button for adding a new project. A user may create as many projects as the user's account or subscription limit allows.

In the example project management UI shown, the UI engine displays an interactive feature allowing the user to edit the project details entered upon creation of the project by selecting the "Edit" link. In some embodiments, the project engine processes and stores any saved changes to the project record, and the UI engine displays the updated details in all appropriate UIs.

In the project management UI, The UI engine displays an interactive feature allowing the user to create a duplicate of an existing project by selecting the "Copy" link. In some embodiments, in response to receiving an indication that a user has selected the "Copy" link, the project engine processes the request and creates a duplicate record with identical fields and generates a new project name. The UI displays the new project in the project management UI.

Deliverables may require multiple versions that are worked on and reviewed simultaneously (for example, to address notes or to map out different scenarios for a project). Some applications require professionals to save each version of a schedule, budget, cash flow sheet, contacts and associated reports as separate documents and update them individually with each version. By contrast, the "Copy" feature allows a professional to speedily duplicate and update all deliverables for a project as a unit, across many versions.

In the project management UI, The UI engine displays an interactive feature allowing the user to delete any project by selecting the "Delete" link. In some embodiments, in response to receiving an indication that a user has selected the "Delete" link, a confirmation of the deletion request is displayed to the user. Upon user confirmation of the deletion request, the project engine processes the request and deletes the project record and associated departmental details. The UI engine no longer displays the project in the project list. In some embodiments, contacts that were entered via a project-related user interface remain in a Contacts Database after the project's deletion.

In the project management UI, the UI engine displays an interactive feature allowing the user to share a project record with other registered users by selecting the "Share" link. In some embodiments, in response to receiving an indication that a user has selected the "Share" link, the UI engine displays a warning to create a copy of the project before sharing it. Upon user confirmation of proceeding with the share request, the UI engine displays a sharing UI where the user can enter identifying information for other registered users in an input field, and the project engine processes and stores the project record in the project tables of all users sharing the project, with a table joining the new project IDs from the receiving user table(s) to the original project ID of the initiating user table. In the project management UI for the receiving user(s), the UI engine displays the shared project in a distinctly identified section in some embodiments.

Project deliverables may be worked on by multiple team members. In some applications, team members must individually exchange each document for updating. Then they must carefully track all changes and incorporate them into a master revised version for each document, which is time-consuming, inefficient, filled with conflicting dates and versions and line items, and otherwise error-ridden. The scheduling and budget application's sharing functionality allows multiple registered users to share a single set of documents on a project. Individual updates are automatically reflected across all documents, and team members can create and share their own personally identified versions of a project for other team members to reference and edit.

Figure 3:
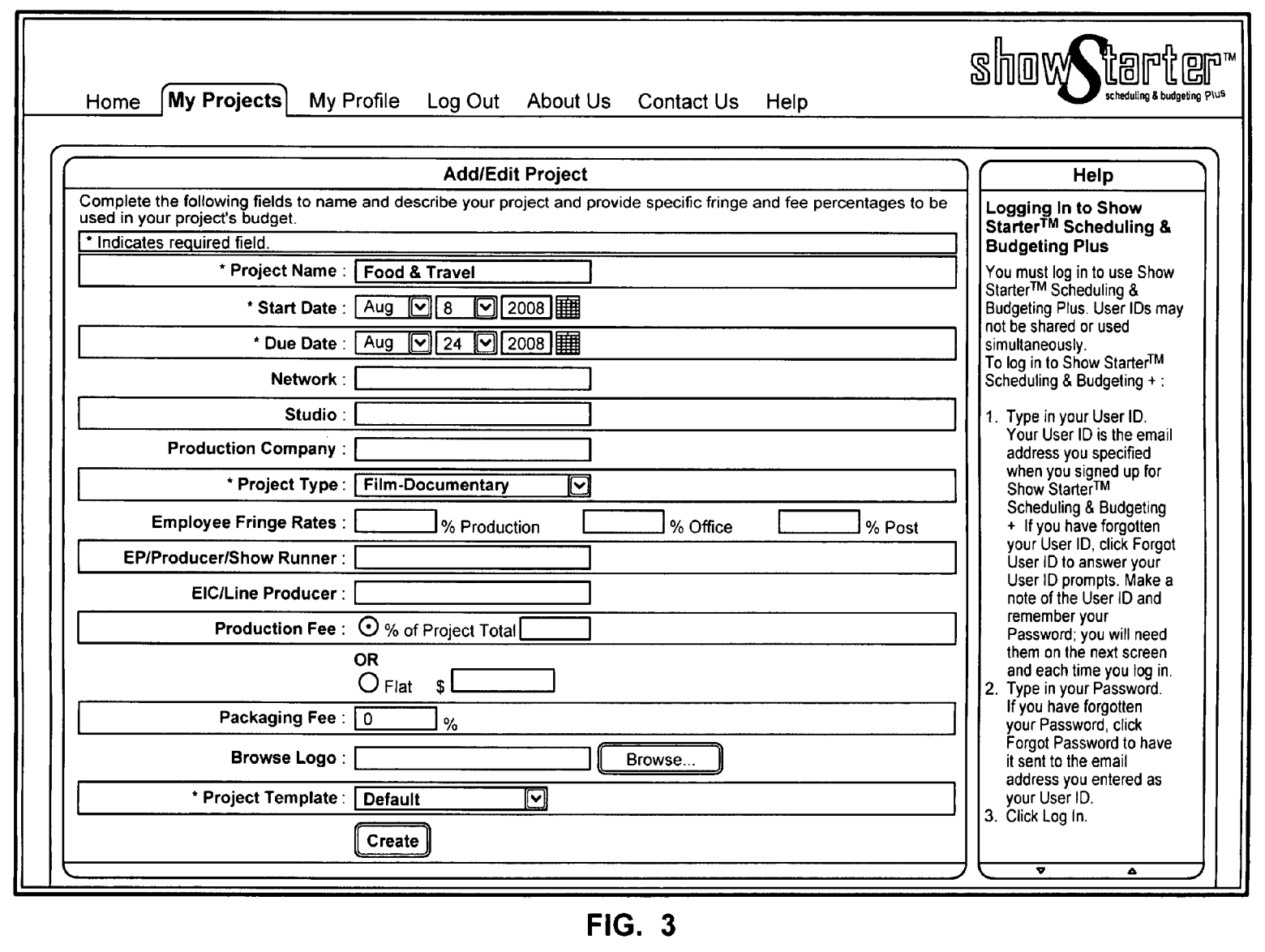

FIG. 3 is a diagram illustrating an embodiment of an add project user interface of a scheduling and budget application. In some embodiments, the add project user interface is displayed in response to the user selecting the "Add New Project" button in FIG. 2.

In the add project user interface, user may enter project details, including type of project, names of principals, rates for fringes and associated fees, such as commissions and contingencies. In example shown, the user may enter a project name, start date, due date, network, studio, production company, project type (for example, a user may choose "Film-Documentary" or "TV-Non-Fiction." In some embodiments, the project type may define, dictate or affect data, functionalities and UIs the application associates with the project), employee fringe rates, EP/Producer/Show Runner, EIC/Line Producer, production fee, packaging fee, logo, and project template. For example, using pull down menu "Project Template," the user may select a template upon which to base a project, including: 1) a blank template with no pre-populated data (such as department names and categories, line item numbers and amounts, and contacts) or reports; and 2) a default template with pre-populated data and reports which are derived from generally accepted industry standards and practice; and 3) a template based on a pre-existing project the user has created. The final option is available only after the user has created one or more projects.

In order to use an existing schedule, budget or cash flow as a template for a new one, some applications require professionals to duplicate the document then manually delete or edit all fields and data. By contrast, the scheduling and budget application automatically adds existing projects to the template options, stripping from the schedule all scheduled weeks and retaining defined line items and amounts (greyed out) and stripping from the budget and cash flow all amounts and retaining the chart of accounts and line items.

In the example shown, the project name is "Food & Travel", the start date is Aug. 8, 2008, the due date is Aug. 24, 2008, the project type is Film-Documentary, and the project template is Default.

The user then selects the "Create" button. In response to the user selecting the "Create" button, the project engine processes the data and creates a record in the database for the project. The UI engine processes the template and project type, renders any associated template- and project-specific data (e.g., departments, line items, associated contacts), and populates a scheduling tab with a calendar user interface and navigational tabs to the site's other functionalities.

Figure 4:
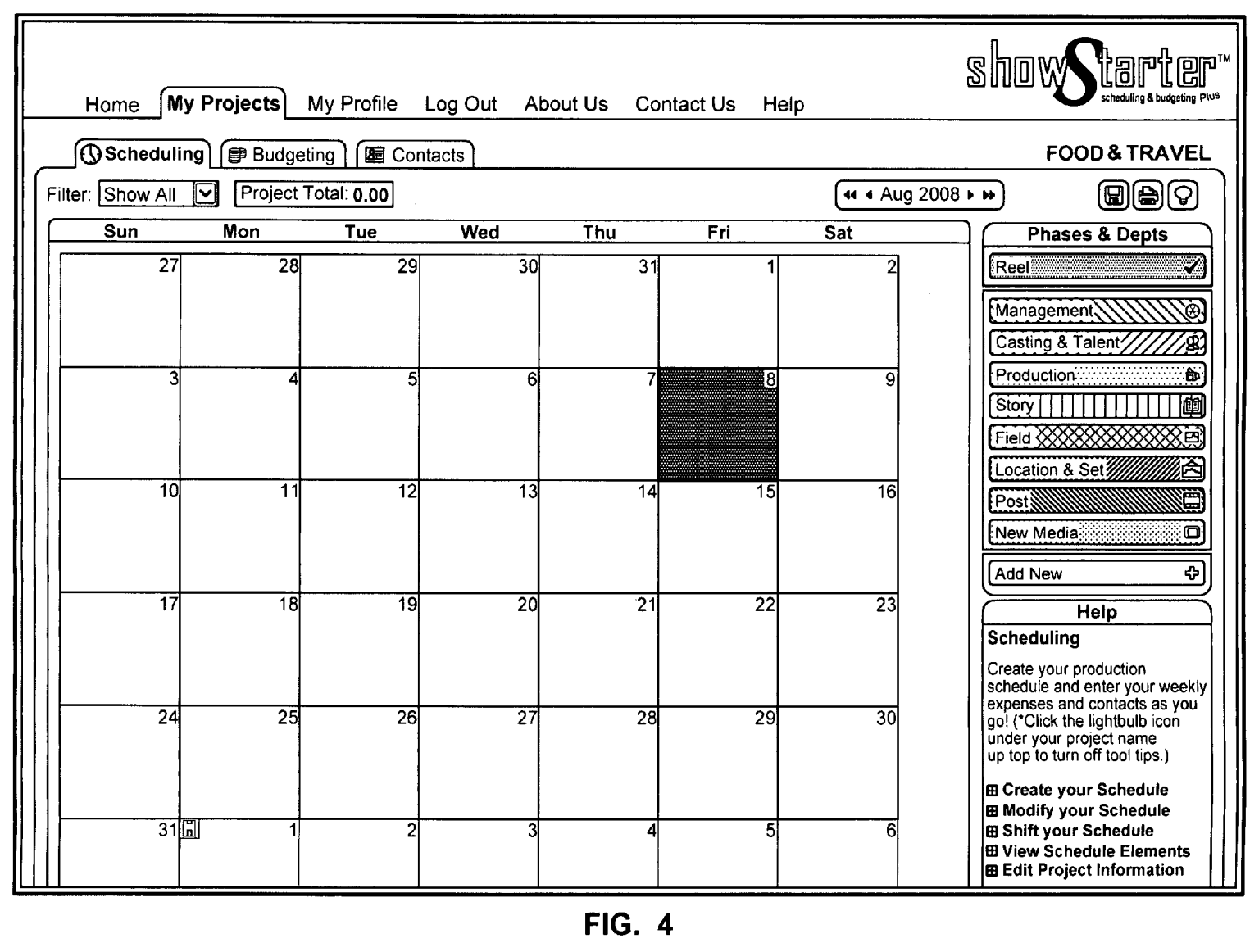

FIG. 4 is a diagram illustrating an embodiment of a calendar user interface of a scheduling and budget application. In some embodiments, the calendar user interface is displayed in response to the user selecting the "Create" button in FIG. 3. In the example shown, three tabs are shown corresponding to three user interfaces: the scheduling user interface, the budgeting user interface, and the contacts user interface. The calendar user interface is shown as part of the scheduling tab or user interface.

On the right hand side is a list of buttons corresponding to project phases or departments. Although the examples herein may describe a phase or a department, either one may be used in various embodiments. The user may select an existing phase or department option and associate it with a date on the calendar. For example, the user may select and/or drag and drop one of the buttons onto a date on the calendar. In response, the project engine processes and stores data to a cache for the project, and the UI engine launches a project phase user interface.

Figure 5:
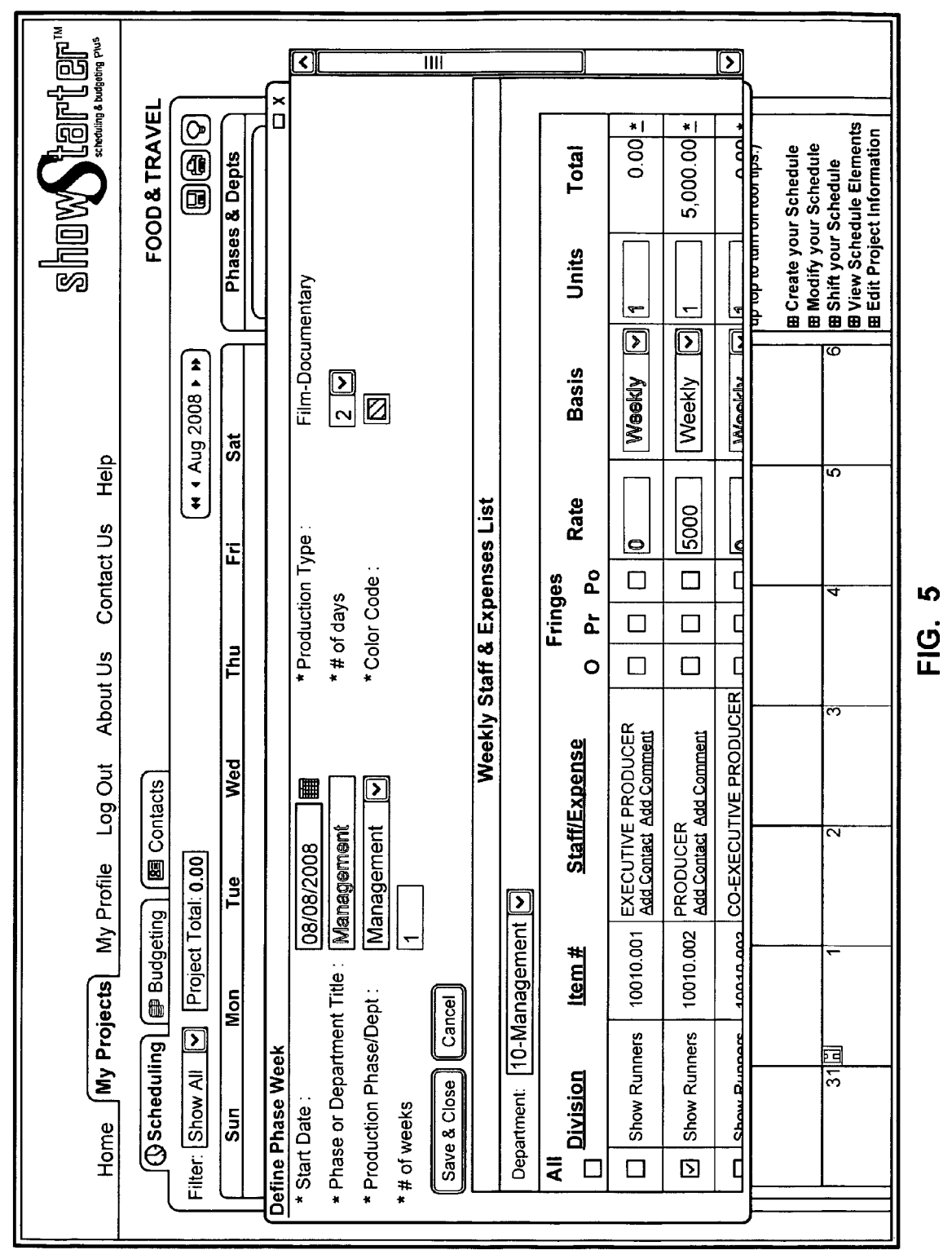

FIG. 5 is a diagram illustrating an embodiment of a project phase user interface of a scheduling and budget application. In the example project phase user interface shown, the user can enter data specific to that department's planned time period (e.g., week(s)) on the project, e.g., number of weeks, numbers of days to be worked each week, color coding and title of the week (for calendar display).

Returning to FIG. 4, the user also can choose to create a new phase or department and associate it with a date on the calendar. For example, the user may select and/or drag and drop the "Add New" button onto a date on the calendar. In response, the project engine processes the data, creates a new record in a phase or departmental table and associates the phase or department with the project record. The UI engine processes the data and renders it then launches the project phase user interface for data entry and processing as depicted in FIG. 5. In some embodiments, the project engine processes and stores all entered data to a cache for the project.

Project schedules are typically built to reflect weekly departmental or phase activity. Some applications require professionals to manually type week-starting and ending dates and descriptions for each week of a project. By contrast, the calendar user interface's drag-and-drop functionality allows users to speedily drop a color-coded department or phase onto the calendar on the desired start date then define a duration or an end date and week description.

In some applications, budget and cash flow documents require weekly increments, but schedules can be built that wrap departments and phases into a single unit that spans multiple weeks, creating budgeting confusion and inefficiency. In some embodiments, the scheduling and budget application limits all schedule input to weekly increments, allowing for perfect synchronization between schedule and weekly cash flow and master budget.

Project schedules may require the same weekly assets across multiple weeks. In some applications, professionals must individually duplicate each week to make it recur in the schedule. Although some applications allow "recurring" weeks that can be scheduled across a block of time, in order to treat each week as a discrete or independent unit, the user has to approve each change manually as independent of the series. By contrast, the phase user interface includes a "# of Weeks" field that allows users to dictate the number of weeks a given phase should repeat, and the application populates the calendar with the duplicated weeks for the user that remain discrete.

Returning to FIG. 5, the user may select the line item expenses they wish to associate with the department or phase on the project and enter financial data, such as pay rate, number of units and cost basis. Upon user selection of variable data fields, such as days worked per week, the UI engine displays a details UI allowing the user to enter defining details for the expense. The project engine processes all entered data and stores it to a cache for the project.

In some embodiments, the user also can create new line items to associate with a departmental week, indicating line item name and additional financial data. The project engine autogenerates a new line item record for the database, and the UI engine renders and displays the line item number and data in the project phase user interface. The user can then select the newly created line item to associate with the current phase and add detail. The project engine processes all entered data and stores it to a cache for the project.

In some embodiments, for each line item, the project engine processes any and all database contacts associated with this line item and project. The UI engine processes the data, renders it and displays an interactive feature allowing the user to choose to associate a contact with the line item. If the project engine finds any Contact Table records with the same line item record id as the current line item, it processes those results, and the UI engine processes the data, renders it and displays it to the user with interactive features. The features allow the user to: associate a contact or contacts with the line item; choose to read and create more contact detail, where the UI engine launches an interactive Contact Detail UI; or choose to create a new contact and associate it with the line item. Upon the user associating any contact with the line item, the project engine processes and stores that contact record to a cache for the project, and the UI engine displays identifying data for that contact in the project phase user interface for visual reference in connection with the line item.

For each line item, selecting "Add Comment" allows the user to add an assumption or comment associated with the line item. Upon receiving an indication that "Add Comment" was selected, the UI engine displays an input field allowing the user to enter and/or upload data. The project engine processes and stores that data with the record for the project. The user can toggle the interactive feature so that the UI engine displays the comment data in the project phase user interface for visual reference in connection with the line item.

In some applications, budget documents require professionals to manually create line item descriptions, which is time-consuming and leads to inconsistency within and across project budgets. By contrast, the scheduling and budget application offers pre-defined line items that can be added to a budget and schedule simply by checking items off on a list.

Items that are scheduled for production do not always invoke an expense in the same week. In some applications, professionals must carefully track and document contract activation dates versus payment dates to keep cash flow current and correct. For example, some vendor orders require advance deposits (which must be reflected in cash flow on the payment date), while the actual vendor or product will not appear on the calendar until a later date (which must be reflected in the schedule for that date). By contrast, in the project phase user interface, users can simply check off a line item to make it active in the schedule and enter a separate payment date to enter that into cash flow.

Project budgets may include staff, vendor or other expenses with the same line item title but being paid at different rates. Some applications require professionals to manually create separate line items for each occurrence of a line item that will be paid at a separate rate. With the scheduling and budget application, users only need to check off and completed budgetary information for each line item, an if a new rate is entered, the scheduling and budget application automatically creates a separate line item for that item in the budget and associates it with the Phase in which it was entered for easy identification and budget integrity.

Different line item assets on a project are paid on different bases: weekly, daily, flat fees, hourly, etc. In some applications, budgeting those assets requires professionals to manually calculate hourly items in a separate space than the other bases, since hourly employees add an additional calculation to the rate/unit/basis formula (namely, the number of hours). The phase user interface utilizes an associated user interface to tabulate hours while keeping the fields on screen uniform.

Project line items and expenses may be fairly standard across an industry. Some applications require professionals to manually enter these line items and expenses for each new project or to copy and clear existing schedules and budgets for new versions. Also, newcomers to an industry do not know the standard line items and benchmarks for projects or have access to experienced contacts to get quotes from. By contrast, the scheduling and budget application's pre-populated department titles, line item descriptions, line item costs and contact database offer speedy, familiar shortcuts to professionals and professional-level information for newcomers.

In some applications, when professionals calculate budgets based on weekly assets assigned to schedules, they must manually check earlier occurrences of rates to maintain consistency of line item rates in the budget. By contrast, in the scheduling and budget application, once a rate has been completed for a line item, the scheduling and budget application pre-populates that line item's rate field with the initial amount for speedy budget consistency and integrity.

By selecting the "Save & Close" button, the user exits the project phase UI and saves all input, and the project engine processes and stores all entered data to a project record. In subsequent events of the user launching that department's Project phase, for all projects created by the user, the UI engine will display both default and new line items created by that user for selection to be associated with that department in a given week or range of weeks.

In the example shown in FIG. 5, the start date is Aug. 8, 2008, the production phase week title is management, the department title is management, the number of weeks is 1, the number of days is 2, and a producer at a rate of $5000 per week has been indicated.

In response to receiving an indication that the "Save & Close" button has been selected, the UI engine closes the project phase UI and displays the schedule UI.

Figure 6:
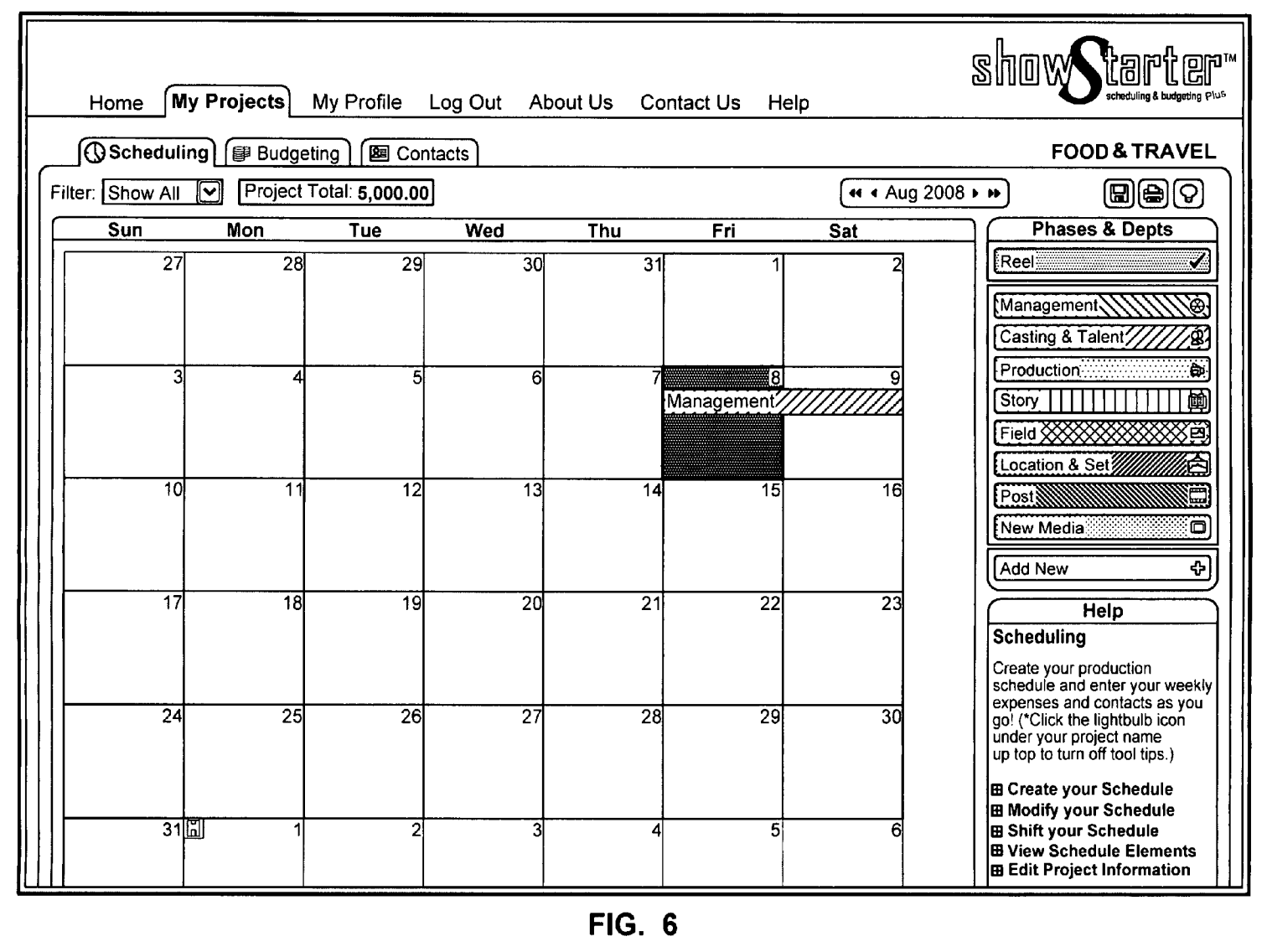

FIG. 6 is a diagram illustrating an embodiment of a calendar user interface of a scheduling and budget application after a project phase has been added. In some embodiments, this calendar user interface is displayed in response to the user selecting the "Save & Close" button in FIG. 5. As shown, a calendar bar titled "Management" is shown on the dates selected in the user interface shown in FIG. 5. As used herein, a calendar bar is a graphical display element comprising a box around text associated with a calendar interface.

Figure 7:
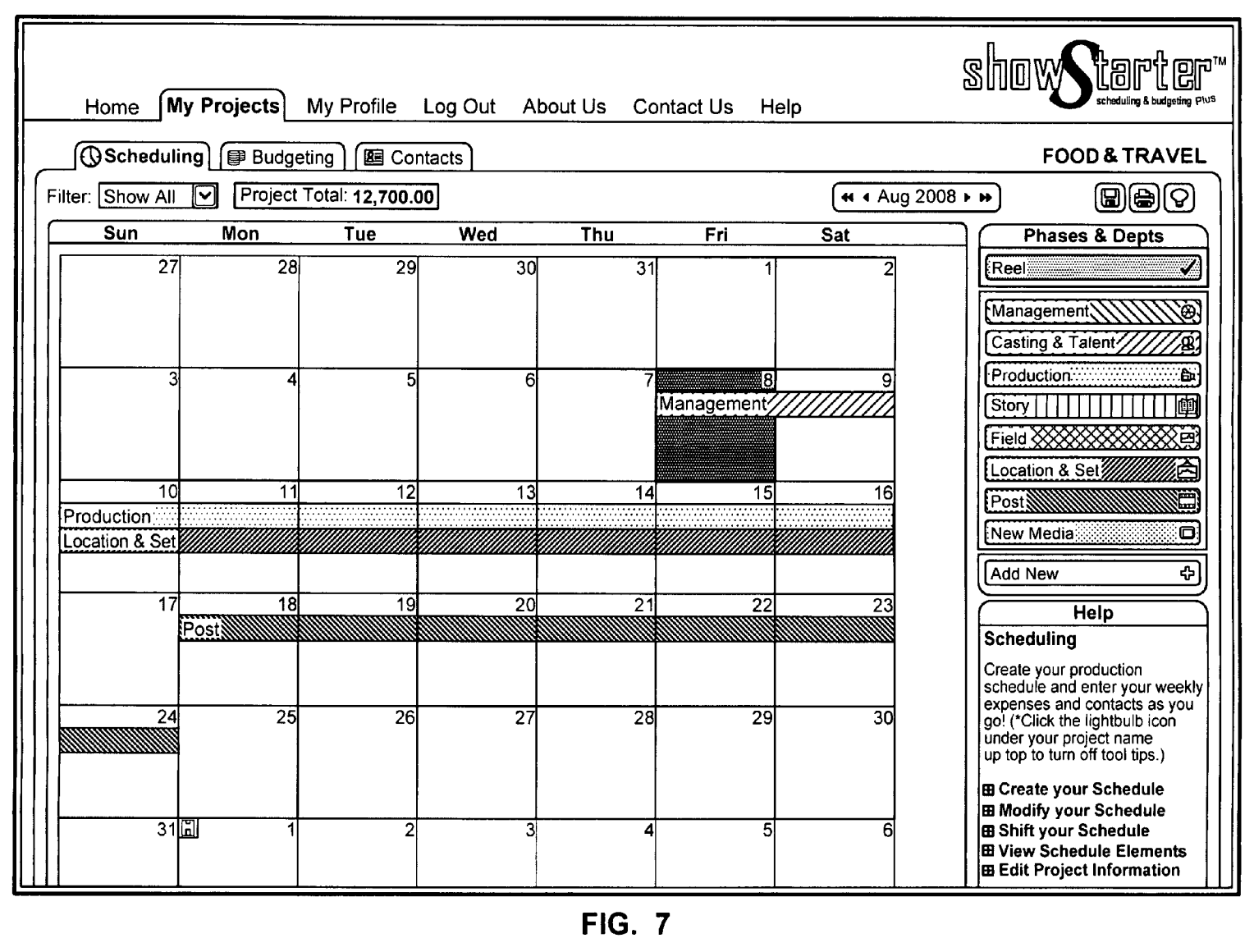

FIG. 7 is a diagram illustrating an embodiment of a calendar user interface of a scheduling and budget application with four project phases. In the calendar user interface, the UI engine displays project phases with calendar bars that span the range of days associated with each project phase. As shown, four project phases have been added: Management, Production, Location & Set, and Post. In some embodiments, each phase is displayed in or using a color associated with the project phase (e.g., the color of the corresponding button in the list of Projects & Depts buttons on the right).

Industry deliverables are regularly managed at the department level. Some applications require professionals to manually define and distinguish departments and phases in spreadsheets or calendar software (with pre-defined color-coding options, if any) or craft separate calendars for each department or phase of a project. By contrast, the calendar user interface provides pre-defined, color-coded project departments and phases for standard industry departments and phases. It also allows users to create and color-code their own departments or phases for a project.

A user can copy an existing calendar bar and duplicate it on a new date on the calendar, e.g., via copy-and-paste functionality. The project engine stores the new project phase in the project record, and the UI engine processes and renders the data and displays the new calendar bar in its new date range. In some embodiments, the UI engine displays the stored changes in all appropriate user interfaces for the project, such as the Calendar, cash flow, Budget and reports user interfaces.

A user can delete an existing calendar bar from the calendar, e.g., via a right-click and delete functionality. In some embodiments, the UI engine displays a warning that deletion is to occur, and if the user confirms the deletion, the project engine removes the record for that departmental week and all associated line items, line item detail and contact associations from the project record. Contacts created through that departmental week remain in the database. In some embodiments, the UI engine no longer displays the deleted record(s) in any UIs for the project, including the Calendar, cash flow, budget and report UIs.

A user can move an existing calendar bar to a new date on the calendar, e.g., via drag-and-drop or cut-and-paste functionality. The project engine stores the new start date for the phase in the project record, and the UI engine processes and renders the data and displays the calendar bar in its new date range. In some embodiments, the UI engine displays the stored changes in all appropriate user interfaces for the project, such as the Calendar, cash flow and Budget user interfaces.

In some embodiments, a user can move multiple project phases or calendar bars as a unit on the calendar, e.g., via keyboard shortcuts, such as Control+Click (simultaneously pressing the "Ctrl" key and a mouse button) and Command+ Click. For example, a plurality of project phases in the calendar view may be selected, dragged, and dropped as a unit. In different implementations, different keyboard and/or mouse inputs may be used to select, drag, and drop multiple project phases. For example, in some embodiments, a plurality of project phases may be selected by hitting Control+Click on each project phase to be selected. Any one of the project phases may then be dragged, causing all selected project phases to be dragged. In response, the project engine stores the new start and end date for each selected departmental week in the project record, and the UI engine processes and renders the data and displays the calendar bars in their new positions. In some embodiments, the UI engine displays the stored changes in all appropriate user interfaces for the project, such as the Calendar, cash flow and Budget user interfaces.

Projects may undergo extensive rescheduling. Some applications require professionals to manually select, change and/or move every week in a schedule individually, one week at a time. In some embodiments, hitting Control+Click on a project phase causes that phase and all of the visible phases that follow it to be locked into a single movable unit. Users then can drag entire sections of the schedule forward or backward on the calendar at once rather than one at a time. Using the filter option allows a user to control+click a single department and shift its schedule without affecting the rest of the departments scheduled on the project.

When creating a schedule based on a digital calendar, users may need to edit/update their calendar. Some application UIs allow date changes only to individual entries, one at a time. A user can manually open a UI to make a text entry to change the date of a single entry, or a user can drag and drop a single entry at a time to a new location. In some applications, a user can depress the shift and click key simultaneously to select multiple items to move as a unit. This process is time-consuming, with more time required as schedules get longer. For example, a 20-week schedule with five weekly entries on each week would require at least 100 discrete moves or multiple entry selections (e.g., shift+clicks). And a 20-week schedule with five daily entries on each weekday would require at least 500 discrete moves or multiple entry selections. Requiring individual moves or selections to update also leaves the user at risk for making errors throughout the update process, including missing some items. In addition, because the process must be done one entry at a time, undoing an update to an entire schedule requires an equal number of discrete moves or selections. That process again is time-consuming and prone to error.

In some applications, a user can define activities and group them together, and manually enter a number of days to "rollover" their assigned date in the future. The problem is, it requires a user to manually identify and group entries in a specific category, manually calculate the number of days to move them. Such applications do not allow rollover for calendar dates, just for activities, so they do not appear in a calendar UI. It also only allows such moves to go forward or later, rather than backwards or earlier, on the schedule.

By contrast, in some embodiments, the scheduling and budget application's "Control+Click" functionality allows the user to simultaneously depress control and click on a single week's phase bar, which locks that week and all of the visible weeks that follow it into a single movable unit. Users then can drag entire sections of the schedule forward or backward on the calendar at once rather than one at a time. Furthermore, invoking the filter option allows a user to control+click a single department and shift its schedule without affecting the rest of the departments scheduled on the project.

In some embodiments, an interactive feature (e.g., the "Filter" pull down menu) allows the user to choose a specific phase(s) or department(s) to view in the calendar user interface (the default view displays all existing departments). Upon user selection of the desired department(s), the UI engine processes and renders the data then displays only the selected department(s) in the schedule UI.

The user can move/change the dates of multiple department weeks within the filtered view, e.g., by selecting a filter in the "Filter" pull down menu. Upon the user opting to move a block of calendar bars, the project engine processes the new start and end dates only for the visible department(s) per the filtering selection. The UI engine processes and renders that data only for the visible department(s) per the filtering selection. Upon user removal of the filter option, the UI engine processes and renders the data and displays all existing departments. Any departments that were moved to new dates while in the filtered view remain in their new position.

Professionals also may need to see isolated schedules at the departmental or project phase level. Some applications require them to manually create separate schedules for "master" versions versus "departmental" versions or to manually define categories for group filtering. By contrast, the calendar user interface allows the user to easily filter for pre-categorized departmental views via a one-step pull down menu.

In some embodiments, the user can select a print option to print the schedule. Upon user selection of the print option, the project engine processes and links all data associated with the project, including project details and departmental week or project phase details. The UI engine processes and renders the data and displays the project details in a header and the departmental or project phase details in a schedule/calendar format. In some embodiments, text is automatically forced to print in black ink to be visible against colored backgrounds.

If a schedule covers more than one month, some applications require the user to manually set a date range to print, then preview for results, then print. The scheduling and budget application allows the user to preview, choose and print desired months easily instantly by including a month scroller within the print user interface.

In some applications, schedules are separate documents from budgets, and calculating and incorporating a project total in a schedule requires first calculating the costs of the scheduled assets into a budget, so professionals build schedules without knowing what production costs they are generating and how those costs will compare to any budget requirements for the project. By contrast, the scheduling and budget application automatically feeds project totals to the schedule UI and the schedule printing user interface. The total field also can easily be toggled off to remove the information from the schedule.

Figure 8:
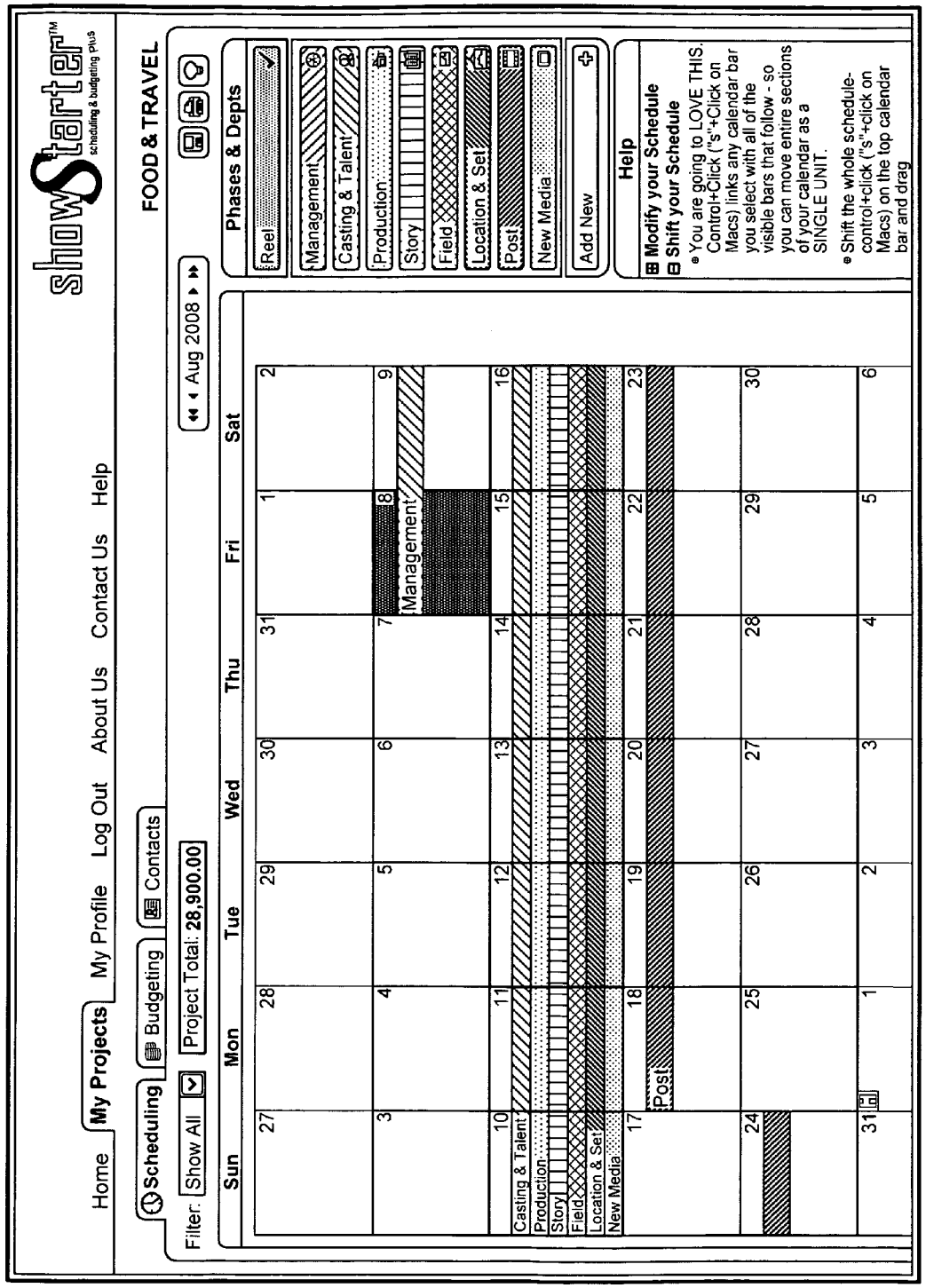
FIG. 8 is a diagram illustrating an embodiment of a calendar user interface of a scheduling and budget application with eight project phases.

FIG. 8 is a diagram illustrating an embodiment of a calendar user interface of a scheduling and budget application with eight project phases. As shown, eight project phases have been added: Management, Casting & Talent, Production, Story, Field, Location & Set, New Media, and Post.

In some embodiments, the order of the buttons in the list of Projects & Depts is preserved in the calendar user interface. In other words, calendar bars are always displayed from top to bottom in a set order regardless of the order in which the user selects them to populate the schedule. For example, for the week of August 10-16, the Production calendar bar is shown above or before the Location & Set calendar bar because the Production button is above or before the Location & Set button in the Phases & Depts order. If a "Reel" phase were to be added to the week of August 10-16, the "Reel" calendar bar would appear above the "Casting & Talent" calendar bar. Although in this example, the order of the calendar bars in the calendar user interface correspond to the Phases & Depts order, in various embodiments, the order of the calendar bars may be specified in other ways. The order may be specified by the user and/or the system. For example, a default order may be provided.

In some embodiments, in response to adding or moving a new project phase such that the new project phase has a time period that overlaps the time period of an existing project phase, the font size of text and calendar bar associated with the existing project phase in the calendar user interface is reduced. In various embodiments, any display element associated with the project phase may be reduced, including font size, the height, or the width of the calendar bar. For example, for the week of August 10-16, six project phases are displayed in the calendar UI. The height of the boxes and the font sizes are reduced compared to those shown in FIG. 7.

In some embodiments, the UI engine displays calendar bars in a default size as the user selects them to populate the schedule. At each point in which the user selects a calendar bar and there is no more vertical room for the UI engine to display it, the UI engine compresses all of the existing calendar bars and the new one to a uniform height to allow all calendar bars to be visible on the schedule. The UI engine simultaneously uniformly reduces the font size for any text appearing on the calendar bars to maintain the text within the top and bottom borders of each calendar bar.

In some embodiments, in response to deleting or moving an existing project phase such that the existing project phase has a time period that previously but no longer overlaps the time period of the project phase, the font size of text and calendar bar associated with the project phase in the calendar user interface is increased. In various embodiments, any display element associated with the project phase may be increased, including font size, the height, or the width of the calendar bar. For example, for the week of August 10-16, six project phases are displayed in the calendar UI. If one or more of these project phases is deleted or moved such that it no longer overlaps with other project phases in the week of August 10-16, then the height of the boxes and the font sizes of the project phases in the week of August 10-16 will increase.

Having the calendar bar and/or font size automatically resize in response to adding and removing project phases as particular dates on the calendar fill up, increases the usability of the scheduling user interface compared to implementations in which the height, width, and font size of the display elements are fixed, in which case, if enough project phases are added to fill up the display for a particular date(s), at least some of the project phases are not displayed. By contrast, in some embodiments, the scheduling and budget application automatically resizes the height of the calendar bars and the font size to always display all entries on screen and the printed page.

In some embodiments, in response to updates to the time period or financial data of a project phase, the project engine dynamically calculates the total of line item expenses entered to date and stores it in a project record, and the UI engine processes the data, renders it and displays it to the user, e.g., in the scheduling user interface next to "Project Total."

In some applications, professionals must manually create formulas to generate subtotals and totals, then scroll to the bottom of a budget document (or navigate to a separate page) to see how updates and changes are effecting their project's bottom line. By contrast, the scheduling and budget application displays a "Project Total" at the top of the scheduling and budgeting screens so users can instantly see how editing a budget in any area affects the total for the project.

Projects may require consultant or executive producer fees that are based on a percentage of the total budget. Professionals currently must manually calculate their budget limits, keeping in mind the additional fee that will be added to the total. Changes to the schedule or budget limitations require the user to back out numbers and manually reconstruct a total that still allows for the fee and meets budget limits. The scheduling and budget application captures any global fee from the user upon project creation then auto-calculates the amounts into the budget. As the budget is changed, project fees are recalculated and added to the budget total, which the user can easily track via the "Project Total" feature on the scheduling and budgeting user interfaces.

In some applications, when a professional edits a project schedule, they must then manually update the budget and cash flow sheet to reflect any budgetary impact of that schedule change. It is not possible, therefore, to track the impact of schedule changes while manipulating the schedule, in order to make budget-limited/-sensitive scheduling decisions during the scheduling process. Because of the scheduling and budget application's linked budget and schedule functionality, the application displays a "Project Total", a running total of expenses in the schedule user interface, allowing users to make budget-conscious schedule changes in real time without opening or editing another document.

FIG. 9 is a diagram illustrating an embodiment of a cash flow user interface of a scheduling and budget application. In the example shown, three tabs are shown corresponding to three user interfaces: the scheduling user interface, the budgeting user interface, and the contacts user interface. The cash flow user interface is shown as part of the budgeting tab or user interface.

In some embodiments, a user selects a tab, radio button, or other interactive element associated with the cash flow user interface, and in response, the project engine processes data (such as departments, categories, line items and fees) and performs required calculations (e.g., subtotals, totals, percentages, etc.) to compute and display the cash flow. In some embodiments, the UI engine processes the data, renders it and dynamically displays it in a cash flow format, with pre-defined sorting, subtotaling and percentage calculations. In some embodiments, the user can toggle an interactive feature to define the periodic intervals for the cash flow, e.g., weekly or monthly line items, and the UI engine processes and renders the data and displays the correlated interval view.

In various embodiments, the user can select to view the cash flow user interface in a defined range of weeks, e.g., only the number of weeks that will fit in the space defined and displayed by the UI engine. In some embodiments, an interactive feature in the cash flow user interface allows the user to move forward and backward to view the following or preceding range of weeks. Another interactive feature allows the user to view the cash flow UI in a single table, with the ability to scroll or otherwise view weeks to the left and right and/or above and below the weeks that fit in the computer display. The user may toggle the feature to switch to a view with a defined range of weeks, and the UI engine updates the display.

In some embodiments, an interactive feature in the cash flow UI allows the user to create a new department, add a default department, or edit a line item from the cash flow user interface and in response, the UI engine launches a project phase user interface with the same functionality and process as when launched from the schedule user interface.

In some applications, cash flow documents are constructed manually, using separate schedules and budgets and translating those into weekly expenses across all departments. By contrast, the scheduling and budget application provides automatic transfer of schedule expenses into a weekly cash flow sheet, using the same application.

In some cases, project budget document line items are defined by department, category and line item with a unique numbering system known as a chart of accounts. In some applications, professionals manually create the chart of accounts and assign distinct numbers to each line item manually, as well, leaving tremendous room for number duplication or error (numbers in the wrong department or category). Professionals also may use an existing budget document with existing line item numbers, requiring them to edit or delete irrelevant or extraneous items. In some embodiments, the scheduling and budget application's default template predefines department, category/division and line item numbers and auto-numbers new line items when the "Add New" function is invoked. Basing a project on an existing project template also auto-numbers new line items. The blank template still allows users to manually construct a chart of accounts.

In some embodiments, the user can select a print option to print the cash flow document. Upon user selection of the print option, the project engine processes and links all data associated with the project, including project details and departmental details. The UI engine processes and renders the data and displays the project details in a header and the departmental details in cash flow format. The user can select a page size from their printer UI, and the UI engine processes that data and sets a view/print area for the cash flow documents so each page displays a defined range of weeks. The UI engine processes and renders the dates for each week and displays them as a header on each page. The UI engine also processes and renders departmental details for each week, e.g. department names and line item numbers, and displays them in the left column for all pages. Upon user printing of the documents, the UI engine converts the established print area into forced page breaks for printing.

Printing horizontally wide spreadsheets currently requires reducing spreadsheet or font size to fit the image on a page or manually selecting print areas and copying field identifying columns for each new necessary page. In some embodiments, the scheduling and budget application automatically assesses how many weeks of information in the cash flow spreadsheet will fit on a page, creates a page break for the user, then populates each subsequent page with the number of weeks that will fit, together with the line item descriptions for speedy printing and clarity of presentation and review.

In some applications, schedule changes require professionals to manually update each affected item and week in the cash flow document. They also must separately update the budget to reflect changes. By contrast, the scheduling and budget application allows users to make changes in the cash flow view that automatically update the schedule and the master budget.

Figure 10:
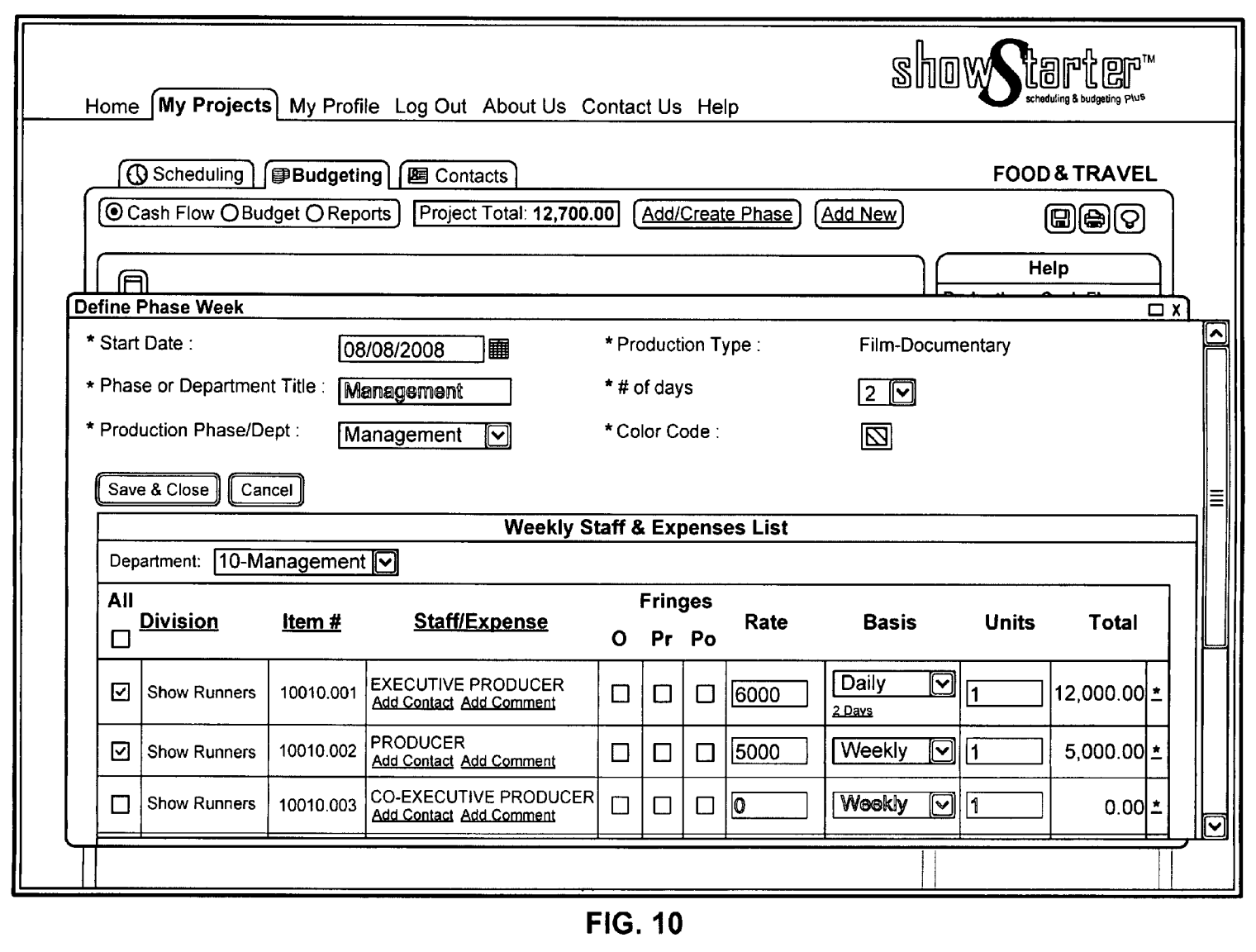

FIG. 10 is a diagram illustrating an embodiment of a project phase user interface that is accessible from the cash flow user interface. In this case, the project phase user interface opens in response to a selection in the cash flow user interface. For example, a user may select a line item in the cash flow shown in FIG. 9, and in response, a project phase user interface corresponding to the line item is launched. In some embodiments, the project phase user interface has the same functionality as the project phase user interface of FIG. 5. The project engine processes and stores all data in a cache for the record until the project phase is saved and closed and the project engine stores all entered data in record for the project.

Figure 11:
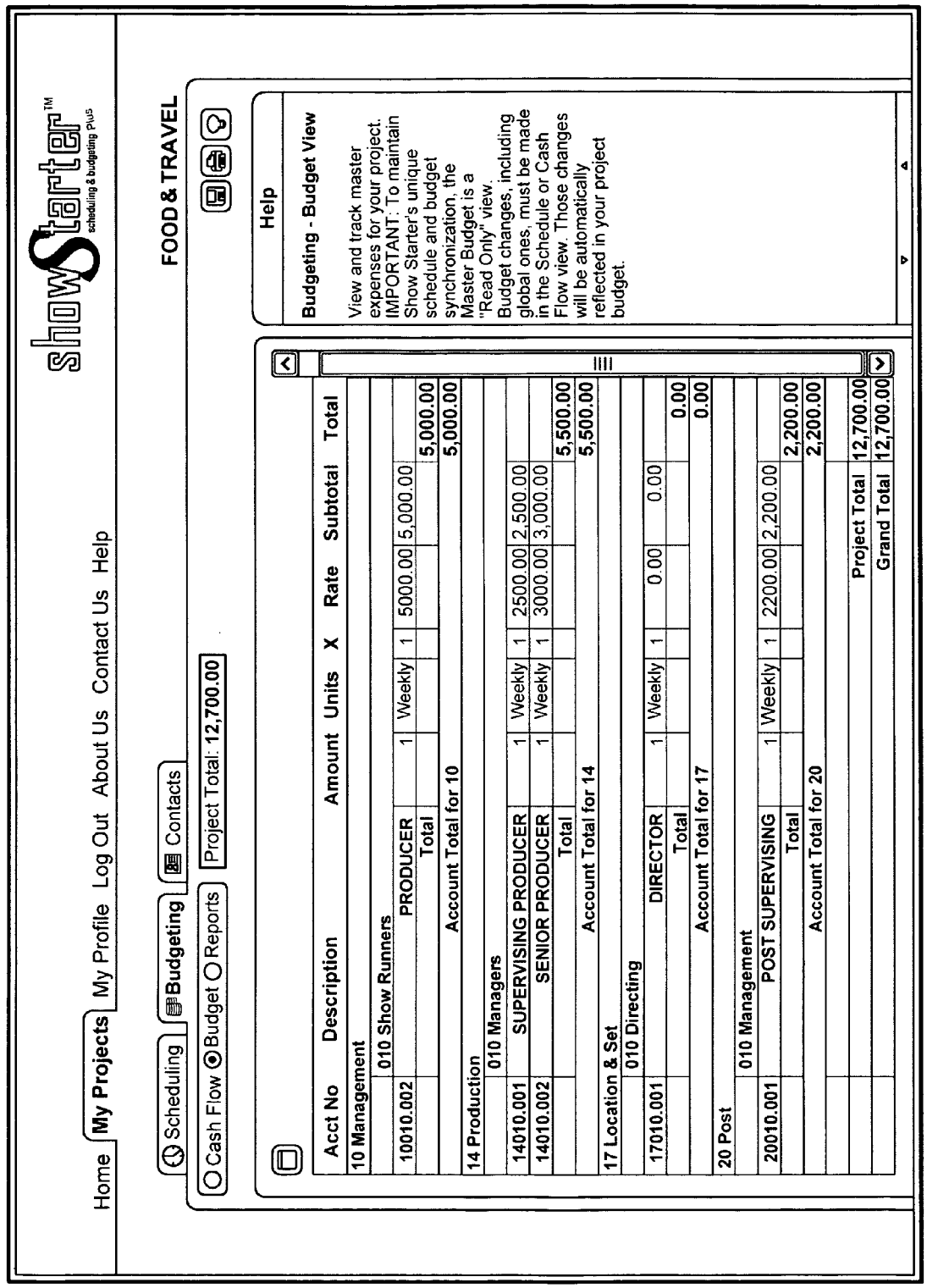
FIG. 11 is a diagram illustrating an embodiment of a budget user interface of a scheduling and budget application.

FIG. 11 is a diagram illustrating an embodiment of a budget user interface of a scheduling and budget application. In the example shown, three tabs are shown corresponding to three user interfaces: the scheduling user interface, the budgeting user interface, and the contacts user interface. The budget user interface is shown as part of the budgeting tab or user interface.

In some embodiments, a user selects a tab, radio button, or other interactive element associated with the budget user interface, and in response, the project engine processes data (such as departments, categories, line items and fees) and performs required calculations (e.g., subtotals, totals, percentages, etc.) to compute and display the budget. The UI engine processes the data, renders it and dynamically displays it in a Budget format, with pre-defined sorting, subtotaling and percentage calculations.

In some embodiments, the UI engine presents the budget in a read-only format. For example, changes must be made either in the scheduling user interface or the cash flow user interface. Because deliverables all are separate documents, changes by one or more team members to one or more documents must be carefully documented and updated uniformly across all related deliverables. This is time-consuming and ripe for error. Thus, in some embodiments, the scheduling and budget application locks the master budget into a read-only state to prevent budget changes being made at the global level without the correct corresponding updates in the weekly schedule and cash flow.

The user can select a print option (e.g., the printer icon) to print the budget. Upon user selection of the print option, the project engine processes and links all data associated with the project, including project details and departmental week details (such as line item details and amounts and comments). The UI engine processes and renders the data and displays the project detail in a header and the departmental detail in budget format. The user can select a page size from their printer UI, and the UI engine processes that data and sets a view/print area so each page fits on the screen and a printed page. Upon user printing of the documents, the UI engine converts the established print area into forced page breaks for printing.

Both industry newcomers and professionals may have no access to highly confidential budgeting and scheduling documents to match project documents to industry standards and expectations. In some embodiments, the scheduling and budget application autoformats user information into standard industry format.

U.S. created applications sometimes only offer the dollar symbol ($) for currency, a hindrance to international users. In some embodiments, the scheduling and budget application does not incorporate any currency symbols in the application so users worldwide may generate and submit financial deliverables that conform to their currency.

Figure 12:
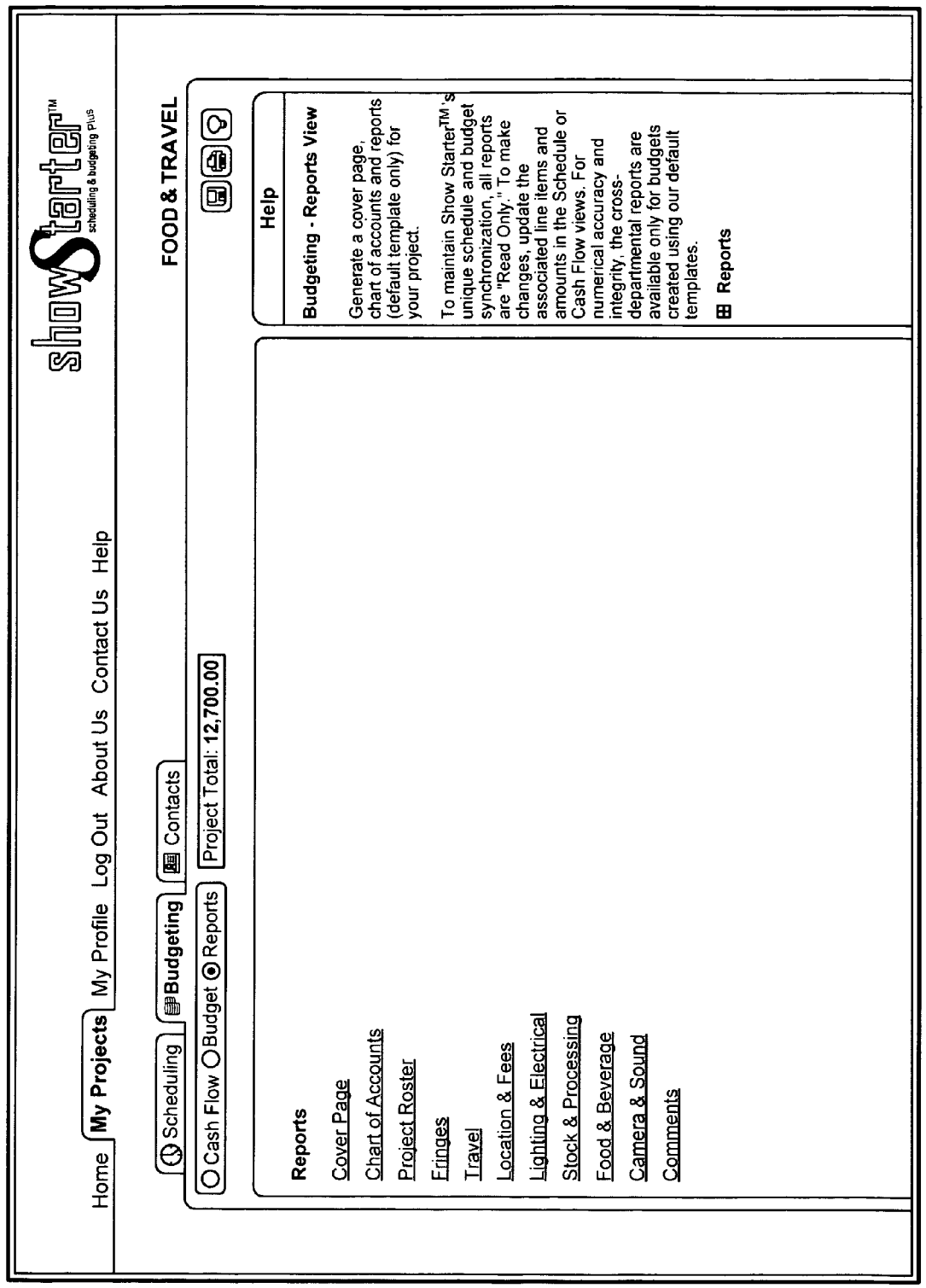
FIG. 12 is a diagram illustrating an embodiment of a reports user interface of a scheduling and budget application.

FIG. 12 is a diagram illustrating an embodiment of a reports user interface of a scheduling and budget application. In the example shown, three tabs are shown corresponding to three user interfaces: the scheduling user interface, the budgeting user interface, and the contacts user interface. The reports user interface is shown as part of the reports tab or user interface.

In some embodiments, a user selects a tab, radio button, or other interactive feature associated with the reports user interface, and in response, the UI engine processes and renders the available reports from the database and displays them to the user.

In some embodiments, upon user selection of a report, the project engine processes all data (such as departments, categories, line items and fees) and performs required calculations (e.g., subtotals, totals, percentages, etc.) for that report. The UI engine processes the data, renders it and dynamically displays it in the appropriate report format, with pre-defined sorting, subtotaling and percentage calculations.

In some embodiments, the UI engine presents reports in a read-only format. For example, changes must be made either in the scheduling UI or the cash flow UI.

Reports may include:

COVER PAGE. FIG. 13 is a diagram illustrating an embodiment of a cover page report. In some embodiments, a cover page report is a top level summary of expenses associated with the project. In some embodiments, upon user selection of a cover page report, the project engine processes all data (such as departments, categories, line items and fees) and performs required calculations (e.g., subtotals, totals, percentages, etc.). The UI engine processes the data, renders it and dynamically displays it, with defined sorting, subtotaling and percentage calculations.

CHART OF ACCOUNTS. FIG. 14 is a diagram illustrating an embodiment of a chart of accounts report. In some embodiments, a chart of account report includes names, numbers and other identifying criteria distinguishing the different departments, categories, line items and other levels of detail for the project. In some embodiments, upon user selection of a chart of accounts report, the project engine processes all data (such as departments, categories and line items). The UI engine processes the data, renders it and dynamically displays it with defined sorting.

PROJECT ROSTER. FIG. 15 is a diagram illustrating an embodiment of a project roster report. In some embodiments, a project roster report includes a view of all allocated assets for the project by selected or defined periodic intervals (e.g., weekly or monthly) without costs/expenses displayed. In some embodiments, upon user selection of a project poster report, the project engine processes all data (such as departments, categories and line items) and performs required calculations (e.g., subtotals of each type of asset). The UI engine processes the data, renders it and dynamically displays it, with defined sorting, subtotaling and intervals.

Budget line item amounts may be closely protected and contractually proprietary. Professionals who oversee the budget cannot turn it over to team members who need to know when items are scheduled for activity, e.g., department heads, project and production managers, etc. Professionals who oversee the budget must also oversee disseminating schedule information, which is time-consuming, inefficient, and ripe for oversight and error. The project roster view of the cash flow report replaces all budget amounts with a symbol ("+"), allowing it to be distributed throughout the team for easy reference, efficiency and tracking by the team members responsible for booking, hiring or contracting for scheduled line items.

FRINGES. In some embodiments, the fringes report includes the total amount budgeted for all payroll fringes, with subtotals at assigned level of detail (e.g., departmental or category). In some embodiments, upon user selection of a fringes report, the project engine processes all data (such as departments, categories, line items and fringe rates) and performs required calculations (e.g., subtotals, totals, percentages, etc.). The UI engine processes the data, renders it and dynamically displays it with defined sorting, subtotaling and rate calculations.

CROSS-DEPARTMENTALS. In some embodiments, the cross-departmental report includes the total amount budgeted for the line item expenses that occur in different departments, with subtotals at assigned level of detail (e.g., category or line item). Examples of cross-departmentals include: travel, location & fees, lighting & electrical, stock & processing, food & beverage, and camera & sound. For example, car rental expenditures that appear in three separate departments in the project phase UI, cash flow UI and budget UI are subtotaled by department and totaled in one report. In some embodiments, upon user selection of a cross-departmental report, the project engine processes all data (such as departments, categories, line items) and performs required calculations (e.g., subtotals, totals, etc.). The UI engine processes the data, renders it and dynamically displays it with defined sorting, subtotaling and totaling functionality.

Budgets may include similar line items in multiple departments. When professionals are seeking to contract with or obtain quotes from vendors for such line items or need to total expenditures in that category, they currently must manually break out those expenses and total them. Cross-departmental reports compile expenses for similar categories across all departments for instant totals.

Project schedules and budgets are required to have departmental integrity, which requires professional knowledge in the project area and is ripe for error. In some applications, professionals must create a departmental schedule then manually transfer that information into a departmental budget with associated line items. By contrast, the scheduling and budget application associates scheduled departments with the correlating budget department to link departmental information automatically across both documents.

COMMENTS. In some embodiments, the comments report includes assumptions and other notes associated with a line item expense. In some embodiments, upon user selection of a comments report, the project engine processes all previously input data (such as departments, categories, line items and text) for comments. The UI engine processes the data, renders it and dynamically displays it with pre-defined sorting.

In some embodiments, the user can select a print option (e.g., a printer icon) to print any report that the UI engine displays. Upon user selection of the print option, the project engine processes and links all data associated with the report, including project details and departmental week details. The UI engine processes and renders the data and displays project detail in a header and the departmental detail in a pre-defined report format. The user can select a page size from their printer UI, and the UI engine processes that data and sets a view/print area so each page fits on the screen and a printed page. Upon user printing of the documents, the UI engine converts the established print area into forced page breaks for printing.

Deliverables may require project-defining information to be printed on all project documents. In some applications, professionals must manually enter that information into headings on each individual document. Changes require manual updates of each individual document, as well. By contrast, the scheduling and budget application captures project-defining data upon project creation and allows quick editing inside of the Edit Project user interface. All edits and updates automatically reflect in any printed document generated by the application.

White text against colored backgrounds is easy to read on-screen but may be hard to read in print and may not copy or fax well. In some embodiments, the scheduling and budget application automatically converts on-screen white text to black when printing a schedule, budget, cash flow, or report.

Some web-based applications require users to rely on the host's servers to maintain their documents, unless a back-up solution is provided. Backing up or exporting to a spreadsheet, however, produces inconsistent or unusable spreadsheets, jeopardizes the necessity of the application, requires the user have compatible software to view the backed up file and cannot be reimported to the application. By contrast, the scheduling and budget application allows the user to back up the project to an XML file (e.g., by selecting the save icon), which can be viewed in any Web browser. Also, in the instance of a host server malfunction, the XML file can fully restore the user's records to the application.

FIG. 16 is a diagram illustrating an embodiment of a contacts user interface of a scheduling and budget application. In the example shown, three tabs are shown corresponding to three user interfaces: the scheduling user interface, the budgeting user interface, and the contacts user interface. The contacts user interface is shown as part of the contacts tab.

In some embodiments, a user selects a tab or other interactive feature associated with the contacts user interface, and in response, the project engine processes all data (such as contact details, associated departments, categories, line items and notes). The UI engine processes the data, renders it and dynamically displays it in a Contact List format, with predefined sorting, filtering and search options.

The user can activate an interactive feature (e.g., by selecting the pencil icon), so the UI engine will display the details for a given contact and allow editing and input of the details by the user.

The user can activate an interactive feature (e.g., by selecting the plus sign icon) so the UI engine will display an input field for the user to create a new contact. In some embodiments, upon user creation of a new contact, the project engine processes and stores the data in a Contacts Table for that user only. A contact may be associated with a line item. If the user selects a line item to associate the new contact with, the project engine processes and stores that data, and upon the user launching a Project phase containing that line item and selecting the associate contact option, the UI engine will display the new contact to the user, along with other contacts already associated with that line item.

The user can activate an interactive feature (e.g., by selecting an item in the "Filter by" pull down menu) so the project engine will filter the list view by defined parameters (e.g., associated with the project, associated with a line item, etc.) and the UI engine will process the data, render it and display the related contacts.

The user can activate an interactive feature (e.g., using the "Search In" pull down menu and/or the "Search Value" box) so the user can input search parameters for contacts, the project engine will process the query and return results, and the UI engine will process the data, render it and display the related contacts.

In some applications, to determine the availability of a resource for a schedule or to obtain a valid quote for a budget, professionals must build, maintain and communicate with a separate contact list of industry resources. When working on a specific project, they also need to document project-specific communication with those resources. Tracking resources independently of a project is time-consuming and inefficient; furthermore, it is difficult for professionals who do not have resources to draw from. Finally, both staff and vendor contact list frequently are required deliverables on projects, and as schedules and budgets change, professionals must manually update associated contacts in a separate document and/or application, which is inefficient and ripe for error.

By contrast, in the scheduling and budget application, users can immediately associate an existing contact in the database with any line item for which a contact exists. Users also can add contacts from their own personal resources and associate those directly with a line item. Because a contact user interface is built directly into both the scheduling and cash flow user interfaces, users can research and communicate with resources in real time as they are preparing those deliverables and document communications in real time as they work. Finally, the contacts user interface allows users to instantly updated, view and print current staff and/or vendor lists for all associated contacts throughout the duration of the project.

Professionals may lack the industry-wide contacts necessary to hire staff, contract with vendors and obtain quotes for budgets, making the scheduling and budgeting process time-consuming and inaccurate in the absence of professional input. The scheduling and budget application offers users a shared database of vetted industry professionals, categorized by line item and instantly accessible through the scheduling, cash flow or contacts user interfaces, with contact information and a notes field to document communication. The scheduling and budget application also allows users to add their own contacts to the database, viewable by that user only.

Advertising on web sites can crowd real estate and lessen credibility for the site. By contrast, in some embodiments, the scheduling and budget application offers "constructively integrated" advertising space in the contacts database, with vetted entries rather than an open directory. System-wide entries can only be entered by The scheduling and budgeting application to maintain quality control over the database.

Professionals may need to research and access industry contacts in connection with industry-standard or project-defined line items, rather than generic categories. In some embodiments, the scheduling and budget application associates all entries in the contacts database with one or more line item numbers and allows users to associate entries that they add to the database with line items, as well. Users also can search for relevant contacts by line item number.

Figure 17:
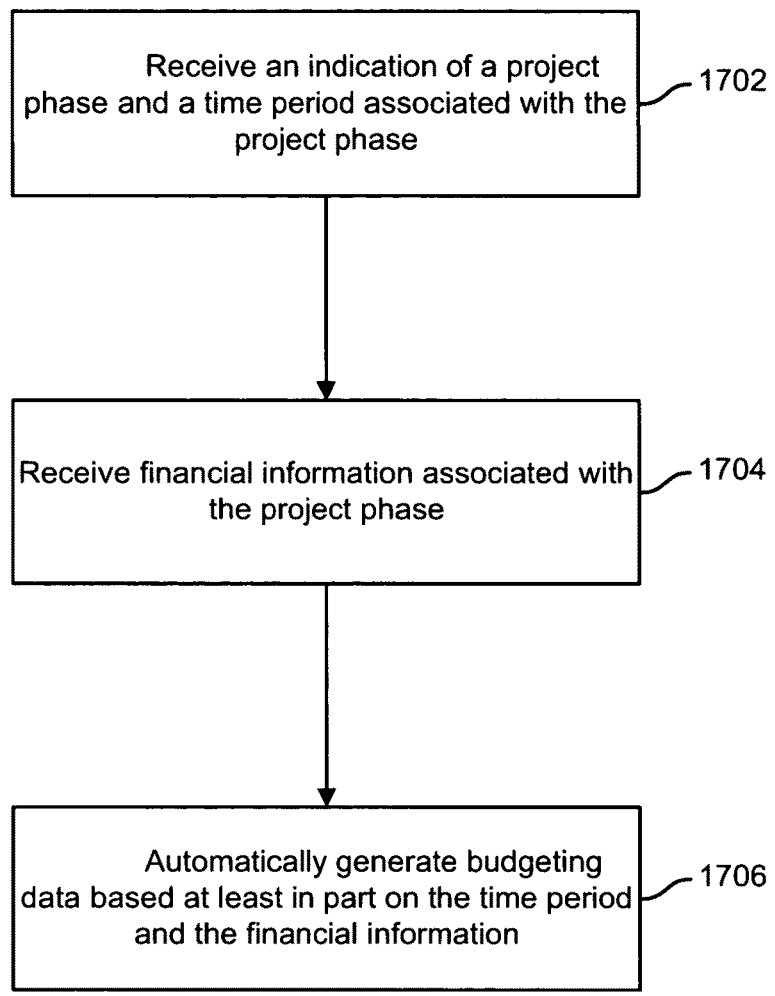
FIG. 17 is a flow chart illustrating an embodiment of a process for generating budgeting information for a project.

FIG. 17 is a flow chart illustrating an embodiment of a process for generating budgeting information for a project. In some embodiments, this process is performed by a scheduling and budget application, such as scheduling and budget application 100.

At 1702, an indication of a project phase and a time period associated with the project phase is received. In some embodiments, an indication that a new project phase has been created or that an existing project phase has been edited is received. For example, referring to FIG. 4, a user may have selected one of the phases & depts buttons and dragged it onto the calendar user interface on a date associated with the start of the time period, causing a project phase user interface (e.g., FIG. 5) to open. In the project phase user interface, the user indicates the duration or end point of the time period. In another example, a user may select one of the phase & depts. buttons, causing a project phase user interface (e.g., FIG. 5) to open. In the project phase user interface, the user indicates the start and duration or end point of the time period. As an example of editing, referring to FIG. 6, a user may have double-clicked on a calendar bar, such as the Management calendar bar shown in FIG. 6, causing a project phase user interface (e.g., FIG. 5) corresponding to the calendar bar to open. The user may then adjust a date and/or length associated with the time period. In some embodiments, in response to receiving an indication that the "Save & Close" button in the project phase user interface (e.g., FIG. 5) has been selected by a user, an indication of a project phase and a time period associated with the project phase is received.

At 1704, financial data associated with the project phase is received. The financial data may include any data used to compute a cash flow or budget, including an expense such as a staff/vendor expense, fringe data, pay rate data, and a basis for the pay rate data. Financial data may be specified in a project phase user interface, for example. In some cases, the financial data is provided by the user. In some cases, the financial data is pre-populated, e.g., in the project phase user interface, based on system-specified values or values that were previously specified by the user for an associated expense.

At 1706, budgeting information is automatically generated based at least in part on the time period and the financial data. For example, a cash flow or budget is automatically generated in response to receiving the time period and/or financial data. In other words, a user may provide project phase and financial data in a calendar user interface (e.g., as shown in FIG. 7), and in response, the cash flow and budget are automatically computed. The user may then select the budgeting tab, and the cash flow and budget are able to be displayed based on the computation. In some embodiments, the cash flow and/or budget are automatically computed in response to the user requesting the cash flow and/or budget, e.g., by selecting the budgeting tab, and/or the cash flow radio button and/or the budget radio button.

When creating a spreadsheet, a user may create a range of data that exceeds the width and/or length of a viewable page (as defined by industry standard screen sizes).

FIG. 18 illustrates an example of a full spreadsheet view of a spreadsheet. The full spreadsheet view may be used to display the full spreadsheet (e.g., by reducing font sizes) so that the full spreadsheet is displayed on a single screen. In some embodiments, the full spreadsheet view is displayed in response to an indication that a "Full spreadsheet view" button has been selected.

FIG. 19A illustrates an example of page one of a page format view of a spreadsheet. The page format view is fully editable, with simple interactive elements, e.g., forward and backward arrows) allowing the user to review and edit data on a page-by-page basis.

In this example, four weeks of a six week project are shown. This is because the viewable page in this example fits four weeks (at a given font size). In order to see the next two weeks, forward arrow button 1902 is selected.

Figure 19B:
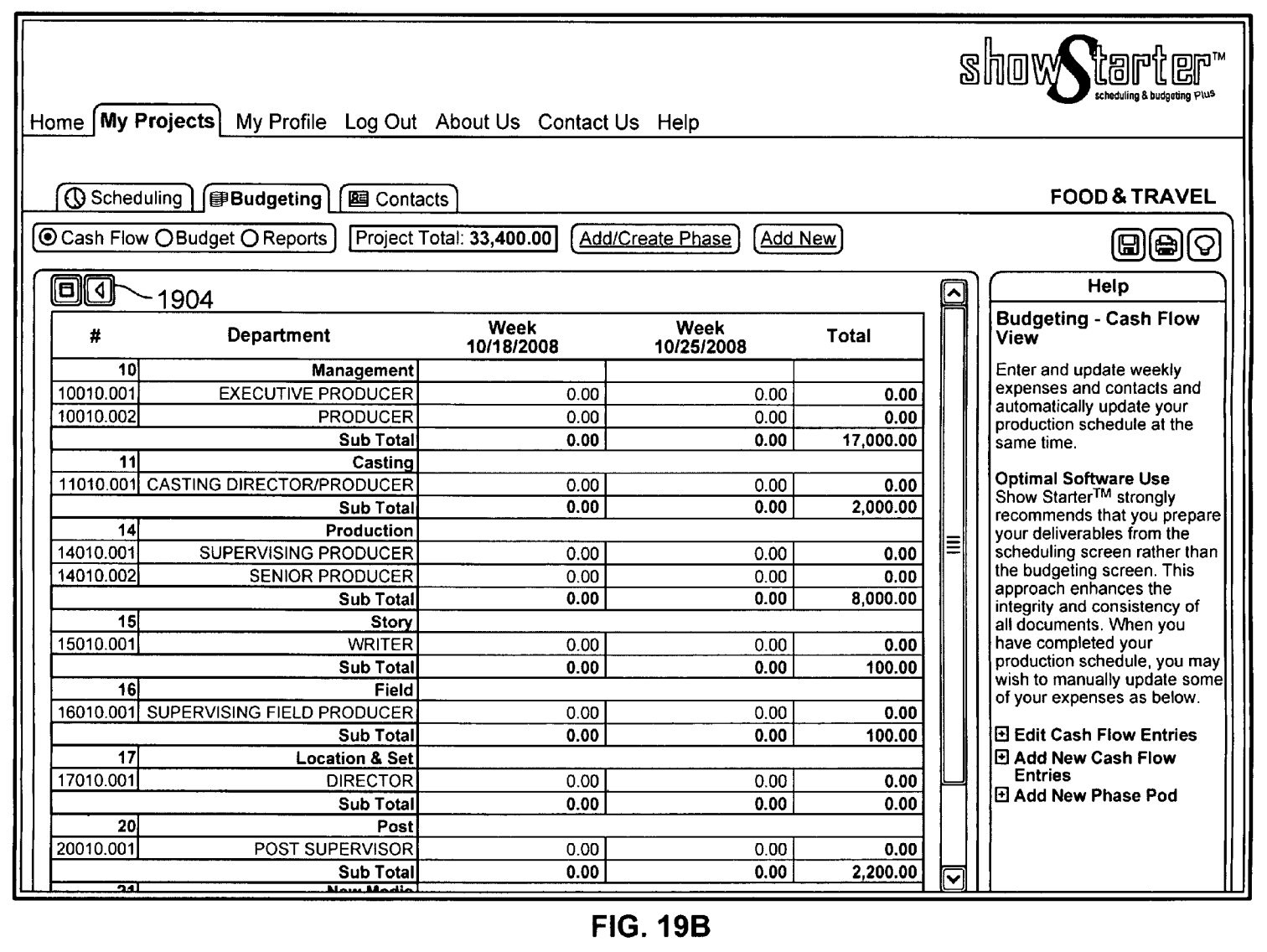

FIG. 19B illustrates an example of page two of a page format view of a spreadsheet. For example, in response to receiving an indication that button 1902 of FIG. 19A is selected, page two is displayed. In this example, the last two weeks of a six week project are shown. Selecting backward arrow button 1904 causes page one to be displayed.

In FIGS. 19A-19B, header columns "#", "Department", and "Total" repeat on each page. A header row indicating the column names also repeats on each page. In some embodiments, header rows (e.g., at the bottom of each page and not shown in this example) "Subtotal", "Project Total", and "Grand Total" are repeated on each page. The header rows and columns are automatically displayed and a user has not configured the display to repeat these elements on each page. In addition, any one of the fields may be edited in FIGS. 19A-19B. For example, a user may select "100.00" next to "WRITER" and in response, a project phase UI corresponding to that entry is displayed. The user may then edit items as desired.

By contrast, some applications require toggling to a "print view" interface to see the data in page format, but print views do not allow editing within the interface. Editing requires returning to the editing interface, searching for the data or data range to be edited, performing any changes, then toggling back to print view to see it in page format again, a process that is time-consuming and ripe for error.

FIGS. 20A-20C illustrate an example of a printout of the spreadsheet of FIG. 18. In some embodiments, in response to an indication that the user has requested the spreadsheet to be printed, the scheduling and budget application automatically analyzes the spreadsheet data to determine a printing format including a print area for a plurality of pages. In this example, the printing format includes printing a header row and header column on each page without the user having to specify that this be done. The printing format also includes an automatically determined print area of each page being printed without the user having to specify print area(s).

The scheduling and budget application automatically assesses how many weeks of information in a spreadsheet will fit on a page, creates a page break for the user, then populates each subsequent page with the number of weeks that will fit, together with the line item descriptions for speedy printing and clarity of presentation and review.

In some embodiments, determining the page format view and/or printing format are implemented as follows.

To allow the printing of an arbitrarily large number of weeks for a single project given the departments/phases assigned to it, the routines account for a mechanism by which all departments are exhaustively dealt with, with respect to each calculated subset of weeks that would permit the linear printing of the phases/departments without causing a spill over. The routine works in a nested iterative manner—implying that the routine for any project, it will iterate over all departments, over all weeks until all phases have been captured for print. On each iteration of the departments list of the project in scope being printed, while parsing through all weeks, a threshold is defined for the number of weeks that can be displayed on a single print page depending on the size chosen by the user.

For each week, (going chronologically ascending) and department, the relevant numbers associated with each combination are pulled from the data model and is committed to a temporary table object until the maximum weeks threshold for that page is reached. When the threshold is reached, the table object is added a to the end of an array of table objects, and assembly of a new table object is started until the departments are processed for the subset of weeks in scope, before moving onto a newer subset of weeks.

After all weeks have been processed for the project, a table objects array is revisited and processed in an ascending fashion where for each table object, a new page is generated in the desired formatting for printing. A grand total is displayed on the page(s) where all departments are completed for a subset of weeks. On the final page all subtotals are aggregated and displayed alongside the grand total.

In some embodiments, modifying calendar bars in a calendar user interface is implemented as follows.

When the calendar is being rendered to screen, for each department line/phase shown, the system will go through two parameter adjustments for each week. At the start of processing each week, the maximum number of phases for that week is determined followed by the pre-set assignment of each of those phases to a fixed height that would include extraction of the day and week's phase information from the prevailing data model and addition to an object that would allow the tracking and modification of each phase's key dimensions. If the maximum number of weeks per day slot (currently set at 4) is found to have been exceeded—a routine will determine a new width for each department line in that week to be:

$$\text{New Line Height} = \text{Mathematical Floor}(\text{Total Slot Size for Department Lines}/\text{Number of Departments})$$

The second parameter that is adjusted is the font size of the text to be shown on the line, e.g., the name of the Department/Phase based to suit the height that has been assigned to any single department line being shown for any week. The font size is mapped by analyzing the existing height of each phase/department after any height adjustments have been to the individual phases/departments and ensuring that any text labels applied to each phase/department are able to fit within the bounds of the visual line indicating the phase/department.

Both parameter adjustments based on the department line counts for any weeks allow for an arbitrary amount of weeks to be displayed for any week in the schedule.

In some embodiments, selection of multiple calendar bars in a calendar user interface is implemented as follows.

The scheduling and budgeting application instance has a number of Javascript event handlers bound to it that allow it process keys that are pressed or mouse behavior during the rendering and display of the weeks calendar in the scheduling and budget application. These key-specific or mouse behavior event handlers enable the application to take distinct action or listen for further user input depending on the keys pressed or mouse action invoked by the end user.

One such event handler deals with the drag action for the calendar. This function is capable of detecting what is being dragged on the calendar. When the function detects that the dragged item in scope is a department line indicating that it is an instance of a week—it will proceed to check whether any key is pressed while the drag event is being processed. If the button pressed is the Ctrl Key or on Mac workstations, the Mac Key, the function enables a toggle allphasemove and sets it to true. Using this parameter, the event handler proceeds to call the function movePhase.

In the event that a multi-week drag/drop was in the process (indicated by allphasemove), the function movePhase proceeds to dispatch an AJAX call which will simulate a Cut/Paste on all weeks in scope as well as iterate over all those weeks to ensure that the delta change in weeks (by comparing the week prior to drag and the week to which the week was dragged), is applied to all those weeks as well to result in a uniform increment/decrement across all the weeks in the project.

The AJAX call ensures that all database entries for those weeks are updated and the calendar is then re-rendered to show the updated weeks.

In some embodiments, filtering the Display of Departmental Weeks (to restrict visible phases for allphasemove) is implanted as follows.

A single drop down is populated with the list of all phases and departments whilst ensuring that each of the listed items are mapped to the unique numeric identifier bound to that phase or department.

By default, Show All is selected (which is granted the value of null) e.g., is not mapped to any numerical value. When a user is to change the value of that selected drop down, a Javascript event handler will capture the change, take note of the new selection by the user and then forward the numerical value of the newly selected drop down value to a function that will set the global Javascript variable for the calendar to the numerical value of the user's selection or set to 0, if the user had chosen Show All.

The calendar is then re-rendered using the filter selection of the end user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating information for an entertainment industry project, the method operable in a non-transitory processing medium and comprising:
    providing a calendar and a scheduling user interface based on the calendar;
    providing a financials user interface;
    receiving by a processor an indication of assets used during a project phase and a time period associated with the project phase;
    receiving financial data associated with the assets used during the project phase;
    associating the indication of assets with the calendar for display on the scheduling user interface and the financial user interface, thereby allowing the user to input or edit scheduling, and financial data to a single dataset, thereby associating the received financial data with the time period associated with the project phase;
    automatically generating financial documents based at least in part on the assets, the time period and the financial data; and
    linking from a processor scheduling information to the financial data for the project,
    wherein the financial documents include budgeting information and cash flow information,
    automatically integrating the budgeting information as the single dataset with the scheduling information and the cash flow information, with the budgeting information automatically integrated to the cash flow information, and with the scheduling information automatically integrated to the cash flow information, and vice versa, through the single dataset from a single database to associate scheduled project phases or departments with the correlating budget department to link departmental information automatically across multiple documents by obtaining the budgeting information, the scheduling information and the cash flow information from the single dataset,
    wherein the assets, the time period and the financial data fed to the budgeting information, cash flow information and scheduling information are automatically integrated into the single dataset, so that changes to the assets, the time period and the financial data in the single database automatically reflect in each of the financial documents, budgeting information, cash flow information and scheduling information and any user interfaces, allowing users to view the cash flow as multiple user interfaces extracted from the same that share the same core data and therefore reflect updates in one user interface across all user interfaces showing budget, schedule and cash flow,
    wherein the scheduling user interface comprises a calendar user interface displaying a plurality of calendar bars,
    wherein each calendar bar is each associated with a project phase, and
    wherein the calendar bars are automatically displayed in an order associated with an order associated with the project phases,
    and wherein a project associated with the budgeting information is associated with entertainment production.

2. The method as recited in claim 1, wherein the budgeting information includes a projected cash flow document.

3. The method as recited in claim 1, wherein the budgeting information includes a budget document.

4. The method as recited in claim 1, wherein the budgeting information is generated in response to receiving the time period or the financial data.

5. The method as recited in claim 1, wherein the budgeting information is generated in response to receiving an indication of a request for the budgeting information.

6. The method as recited in claim 1, wherein the assets associated with the project phase or time period, and the financial data associated with the assets are received via the scheduling user interface or a cash flow user interface provided as a function of the financials user interface.

7. The method as recited in claim 6, wherein the scheduling user interface comprises a monthly calendar user interface.

8. The method as recited in claim 6, wherein the cash flow user interface comprises a weekly cash flow user interface.

9. The method as recited in claim 6, wherein the cash flow user interface comprises a daily, annual or custom-identified cash flow user interface.

10. The method as recited in claim 9, wherein the project, time period, or financial data is received via a user interface accessible from the scheduling user interface or a cash flow user interface.

11. The method as recited in claim 10, wherein the user interface opens in response to a selection in the scheduling user interface or cash flow user interface.

12. The method as recited in claim 1, further including receiving an edit to a selected asset, the time period or financial data associated with the selected asset, and in response to receiving the edit, automatically generating updated budgeting information based at least in part on the edit.

13. The method as recited in claim 12, wherein the edit to the time period or financial data is received via the scheduling user interface or a cash flow user interface.

14. The method as recited in claim 13, wherein the edit to the time period or financial data is received via a user interface accessible from the scheduling user interface or the cash flow user interface.

15. The method as recited in claim 14, wherein the user interface opens in response to a selection in the scheduling user interface or cash flow user interface.

16. The method as recited in claim 1, wherein the time period or financial data is user editable via the scheduling user interface or a cash flow user interface.

17. The method as recited in claim 1, wherein the time period or financial data is not user editable via a budget view.

18. The method as recited in claim 1, wherein the financial data includes an expense.

19. The method as recited in claim 18, wherein the financial data includes a named asset related to the project, such as a staff or vendor expense.

20. The method as recited in claim 19, wherein the financial data includes pay rate data.

21. The method as recited in claim 20, wherein the financial data includes a basis for the pay rate data.

22. The method as recited in claim 1, wherein at least a portion of the financial data is pre-populated.

23. The method as recited in claim 1, wherein at least a portion of contact information associated with the financial data is pre-populated or provided by a user, and associating the contact information with the assets, the time period and the financial data.

24. The method as recited in claim 1, further including generating a report based at least in part on the time period and the financial data.

25. The method as recited in claim 24, wherein the report includes a subset of the budgeting information.

26. The method as recited in claim 1, wherein a project associated with the budgeting information is shared with more than one user or user account.

27. The method as recited in claim 1, wherein a copy can be automatically made of a project associated with the budgeting information.

28. The method as recited in claim 1, wherein a plurality of calendar bars may be selected, dragged and dropped as a unit.

29. The method as recited in claim 1, wherein the scheduling user interface comprises a monthly calendar user interface and further including, in response to adding or moving a new project phase such that the new project phase has a time period that overlaps the time period of the project phase, reducing the font size of text associated with the project phase.

30. The method as recited in claim 1, wherein the scheduling user interface comprises a monthly calendar user interface and further including, in response to deleting or moving an existing project phase such that the existing project phase has a time period that previously but no longer overlaps the time period of the project phase, increasing the font size of text associated with the project phase.

31. The method as recited in claim 1, wherein the scheduling user interface comprises a monthly calendar user interface configured to display a plurality of phase display elements, each display element representing a project phase, and further comprises, in response to adding a new project phase or moving a project phase such that the new or moved project phase has a time period that overlaps the time period of an existing or other project phase, reducing a height or width of the display element associated with the project phase, wherein the reduction enables all display elements to remain simultaneously visible on the interface.

32. The method as recited in claim 31, wherein the display element comprises a calendar bar.

33. The method as recited in claim 1, wherein the scheduling user interface comprises a monthly calendar user interface and further including, in response to deleting or moving an existing project phase such that the existing project phase has a time period that previously but no longer overlaps the time period of the project phase, increasing a height or width of a display element associated with the project phase.

34. The method as recited in claim 1,
wherein the scheduling user interface comprises a monthly calendar user interface displaying a plurality of calendar bars,
wherein each calendar bar is displayed using a color associated with a corresponding project phase.

35. The method as recited in claim 1, further comprising generating and displaying a running project total.

36. The method as recited in claim 1, wherein the order associated with the project phases is user configurable.

37. The method as recited in claim 1, wherein the budgeting data comprises a budget or a cash flow and the method further comprises printing the budget or the cash flow using an automatically determined printing format including a print area for a plurality of pages.

38. The method as recited in claim 1, further comprising:
receiving an indication that a plurality of calendar bars in a calendar user interface has been selected;
receiving an indication that the plurality of calendar bars has been dragged to a new date in the calendar user interface; and
in response to receiving the second indication, moving the calendar bars and displaying the calendar bars in a new location associated with the new date in the calendar user interface.

39. A system for generating budgeting information for an entertainment industry project, including:
a processor configured to:
provide a calendar,
provide a scheduling user interface based on the calendar,
provide a financials user interface,
receive an indication of a project phase and a time period associated with the project phase,
receive financial data associated with the project phase, associate the indication of assets with the calendar for display on the scheduling user interface and the financial user interface, thereby allowing the user to input or edit scheduling, and financial data to a single dataset, thereby associating the received financial data with the time period associated with the project phase, automatically generate financial documents based at least in part on the time period and the financial data, link scheduling information to the financial data for the project, and a memory coupled to the processor and configured to provide the processor with instructions, wherein the financial documents include budgeting information and cash flow information, with the budgeting information automatically integrated as a single dataset with the scheduling information and the cash flow information, with the budgeting information automatically integrated to the cash flow information, and with the scheduling information automatically integrated to the cash flow information, and vice versa, through the single dataset from a single database to associate scheduled project phases or departments with the correlating budget department to link departmental information automatically across multiple documents by obtaining the budgeting information, the scheduling information and the cash flow information from the single dataset, wherein the assets, the time period and the financial data fed to the budgeting information, cash flow information and scheduling information are automatically integrated into the single dataset, so that changes to the assets, the time period and the financial data in the single database automatically reflect in each of the financial documents, budgeting information, cash flow information and scheduling information and any user interfaces, allowing users to view the cash flow as multiple user interfaces extracted from the same that share the same core data and therefore reflect updates in one user interface across all user interfaces showing budget, schedule and cash flow, wherein the scheduling user interface comprises a calendar user interface displaying a plurality of calendar bars, wherein each calendar bar is each associated with a project phase, and wherein the calendar bars are automatically displayed in an order associated with an order associated with the project phases, and wherein a project associated with the budgeting information is associated with entertainment production.

40. A computer program product for generating budgeting information for an entertainment industry project, the computer program product being embodied in a non-transitory computer readable medium and comprising computer instructions for:

providing a calendar and a scheduling user interface based on the calendar;

providing a financials user interface;

receiving an indication of a project phase and a time period associated with the project phase;

receiving financial data associated with the project phase;

associating the indication of assets with the calendar for display on the scheduling user interface and the financial user interface, thereby allowing the user to input or edit scheduling, and financial data to a single dataset, thereby associating the received financial data with the time period associated with the project phase;

automatically generating financial documents based at least in part on the time period and the financial data; and linking scheduling information to the financial data for the project, wherein the financial documents include budgeting information and cash flow information, automatically integrating the budgeting information as a single dataset with the scheduling information and the cash flow information, the budgeting information automatically integrated to the cash flow information, the scheduling information automatically integrated to the cash flow information, and vice versa, through the single dataset from single database to associate scheduled project phases or departments with the correlating budget department to link departmental information automatically across multiple documents by obtaining the budgeting information, the scheduling information and the cash flow information from the single dataset, wherein the assets, the time period and the financial data fed to the budgeting information, cash flow information and scheduling information are automatically integrated into the single dataset, so that changes to the assets, the time period and the financial data in the single database automatically reflect in the financial documents, budgeting information, cash flow information and scheduling information and any user interfaces, allowing users to view the cash flow as multiple user interfaces extracted from the same that share the same core data and therefore reflect updates in one user interface across all user interfaces showing budget, schedule and cash flow, wherein the scheduling user interface comprises a calendar user interface displaying a plurality of calendar bars, wherein each calendar bar is each associated with a project phase, and wherein the calendar bars are automatically displayed in an order associated with an order associated with the project phases, and wherein a project associated with the budgeting information is associated with entertainment production.

* * * * *